US010187277B2

(12) United States Patent
Chan

(10) Patent No.: US 10,187,277 B2
(45) Date of Patent: Jan. 22, 2019

(54) SCORING USING DISTRIBUTED DATABASE WITH ENCRYPTED COMMUNICATIONS FOR CREDIT-GRANTING AND IDENTIFICATION VERIFICATION

(71) Applicant: www.TrustScience.com Inc., Edmonton (CA)

(72) Inventor: Leo M. Chan, Edmonton (CA)

(73) Assignee: WWW.TRUSTSCIENCE.COM INC., Edmonton (CA)

( * ) Notice: Subject to any disclaimer, the term of this patent is extended or adjusted under 35 U.S.C. 154(b) by 0 days.

(21) Appl. No.: 15/953,011

(22) Filed: Apr. 13, 2018

(65) Prior Publication Data
US 2018/0316583 A1 Nov. 1, 2018

Related U.S. Application Data

(63) Continuation of application No. 15/623,103, filed on Jun. 14, 2017, now abandoned, which is a
(Continued)

(51) Int. Cl.
H04L 12/26 (2006.01)
G06F 17/30 (2006.01)
(Continued)

(52) U.S. Cl.
CPC ........ H04L 43/065 (2013.01); G06F 17/3064 (2013.01); G06N 7/005 (2013.01);
(Continued)

(58) Field of Classification Search
CPC .............................. H04L 43/065; H04L 67/22
See application file for complete search history.

(56) References Cited

U.S. PATENT DOCUMENTS 6,108,308 A 8/2000 Flavin et al.
6,286,007 B1 9/2001 Miller et al.
(Continued)

FOREIGN PATENT DOCUMENTS

CA 2600344 A1 9/2006
CA 2775899 A1 4/2011
(Continued)

OTHER PUBLICATIONS

Tang, et al. Social influence analysis in large-scale networks. p. 807. Proceedings of the ACM SIGKDD International Conference on Knowledge Discovery and Data Mining ; KDD '09: Proceedings of the 15th ACM SIGKDD International Conference on Knowledge Discovery and Data Mining (15th ACM SIGKDD International Conference on Knowledge Discovery and Data Mining, KDD '09—Jun. 28, 2009 to Jul. 1, 2009—Paris), Jan. 1, 2009; Jun. 28, 2009—Jul. 1, 2009 ACM, 2 Penn Plaza, Suite 701 New York NY 10121-0701 USA.
(Continued)

Primary Examiner — Arvin Eskandarnia
(74) Attorney, Agent, or Firm — Amin, Turocy & Watson, LLP

(57) ABSTRACT

A system is provided for determining network connectivity between a first node and a second node connected to the first node by at least one path is provided, the system comprising a parallel computational framework comprising a plurality of processors, the system being connected to a data store device, a key-value store device and an application server comprising processing circuitry. The system can be operable to receive a user request for a network connectivity value between a first entity of a network community and a second entity of the network community. The system is also operable to transmit an indication of the user request to a first remote server and receive an indication of the network
(Continued)

connectivity value from the first remote server. The system is also operable to automatically determine at least one prospective decision regarding the second entity based on a magnitude of the network connectivity value.

20 Claims, 13 Drawing Sheets

Related U.S. Application Data continuation of application No. 15/224,063, filed on Jul. 26, 2016, now abandoned, which is a continuation of application No. 13/503,352, filed as application No. PCT/CA2010/001658 on Oct. 22, 2010, now Pat. No. 9,443,004.

(60) Provisional application No. 61/254,313, filed on Oct. 23, 2009.

(51) Int. Cl.
 G06N 7/00 (2006.01)
 H04L 12/24 (2006.01)
 H04L 29/08 (2006.01)

(52) U.S. Cl.
 CPC ............ *H04L 41/14* (2013.01); *H04L 43/045* (2013.01); *H04L 43/0805* (2013.01); *H04L 43/16* (2013.01); *H04L 67/22* (2013.01)

(56) References Cited

U.S. PATENT DOCUMENTS

| | | | |
|---|---|---|---|
| 6,356,902 B1 | 3/2002 | Tan et al. |
| 6,446,048 B1 | 9/2002 | Wells et al. |
| 6,509,898 B2 | 1/2003 | Chi et al. |
| 6,633,886 B1 | 10/2003 | Chong |
| 6,708,308 B2 | 3/2004 | De Souza et al. |
| 6,738,777 B2 | 5/2004 | Bliss et al. |
| 6,751,729 B1 | 6/2004 | Giniger et al. |
| 6,823,299 B1 | 11/2004 | Contreras |
| 7,069,259 B2 | 6/2006 | Horvitz et al. |
| 7,086,085 B1 | 8/2006 | Brown et al. |
| 7,130,262 B1 | 10/2006 | Cortez et al. |
| 7,130,908 B1 | 10/2006 | Pecus et al. |
| 7,139,837 B1 | 11/2006 | Parekh et al. |
| 7,266,649 B2 | 9/2007 | Yoshida et al. |
| 7,272,719 B2 | 9/2007 | Bleckmann et al. |
| 7,451,365 B2 | 11/2008 | Wang et al. |
| 7,512,612 B1 | 3/2009 | Akella et al. |
| 7,539,697 B1 | 5/2009 | Akella et al. |
| 7,664,802 B2 | 2/2010 | Aaltonen et al. |
| 7,668,665 B2 | 2/2010 | Kim |
| 7,685,192 B1 | 3/2010 | Scofield et al. |
| 7,743,208 B2 | 6/2010 | Yoshida et al. |
| 7,822,631 B1 | 10/2010 | Vander Mey et al. |
| 7,865,551 B2 | 1/2011 | Mcculler |
| 7,886,334 B1 | 2/2011 | Walsh |
| 7,930,255 B2 | 4/2011 | Choi et al. |
| 8,010,458 B2 | 8/2011 | Galbreath et al. |
| 8,010,460 B2 | 8/2011 | Work et al. |
| 8,108,536 B1 | 1/2012 | Hernacki et al. |
| 8,156,558 B2 | 4/2012 | Goldfeder et al. |
| 8,170,958 B1 | 5/2012 | Gremett et al. |
| 8,180,804 B1 | 5/2012 | Narayanan et al. |
| 8,214,883 B2 | 7/2012 | Obasanjo et al. |
| 8,234,688 B2 | 7/2012 | Grandison et al. |
| 8,244,848 B1 | 8/2012 | Narayanan |
| 8,261,078 B2 | 9/2012 | Barriga et al. |
| 8,301,617 B2 | 10/2012 | Muntz et al. |
| 8,306,973 B2 | 11/2012 | Ohazama et al. |
| 8,316,056 B2 | 11/2012 | Wable |
| 8,392,590 B2 | 3/2013 | Bouchard et al. |
| 8,443,366 B1 | 5/2013 | Yancey |
| 8,468,103 B2 | 6/2013 | Galbreath et al. |
| 8,489,641 B1 | 7/2013 | Seefeld et al. |
| 8,516,196 B2 | 8/2013 | Jain et al. |
| 8,572,129 B1 | 10/2013 | Lee et al. |
| 8,601,025 B1 | 12/2013 | Shajenko et al. |
| 8,606,721 B1 | 12/2013 | Dicker |
| 8,682,837 B2 | 3/2014 | Skelton |
| 8,683,423 B2 | 3/2014 | Amaral et al. |
| 8,688,701 B2 | 4/2014 | Ghosh et al. |
| 8,832,093 B2 | 9/2014 | Redstone et al. |
| 8,832,790 B1 | 9/2014 | Villa et al. |
| 8,949,250 B1 | 2/2015 | Garg et al. |
| 9,143,503 B2 | 9/2015 | Lo et al. |
| 9,154,491 B1 | 10/2015 | Leske |
| 9,223,978 B2 | 12/2015 | Kraemer |
| 9,319,419 B2 | 4/2016 | Sprague et al. |
| 9,390,243 B2 | 7/2016 | Dhillon et al. |
| 9,438,619 B1 | 9/2016 | Chan et al. |
| 9,443,004 B2* | 9/2016 | Chan .................... G06F 17/3064 |
| 9,443,044 B2* | 9/2016 | Gou ...................... G06F 17/5022 |
| 2003/0046280 A1 | 3/2003 | Roller et al. |
| 2003/0133411 A1 | 7/2003 | Ise et al. |
| 2003/0227924 A1 | 12/2003 | Kodialam et al. |
| 2004/0018518 A1 | 1/2004 | Krieb et al. |
| 2004/0088147 A1 | 5/2004 | Wang et al. |
| 2004/0122803 A1 | 6/2004 | Dom et al. |
| 2004/0181461 A1 | 9/2004 | Raiyani et al. |
| 2004/0181518 A1 | 9/2004 | Mayo et al. |
| 2004/0239674 A1 | 12/2004 | Ewald |
| 2005/0096987 A1 | 5/2005 | Miyauchi |
| 2005/0243736 A1 | 11/2005 | Faloutsos et al. |
| 2005/0256949 A1 | 11/2005 | Gruhl et al. |
| 2006/0212931 A1 | 9/2006 | Shull et al. |
| 2006/0271564 A1 | 11/2006 | Meng Muntz et al. |
| 2006/0287842 A1 | 12/2006 | Kim |
| 2006/0290697 A1 | 12/2006 | Madden et al. |
| 2006/0294134 A1 | 12/2006 | Berkhim et al. |
| 2007/0109302 A1 | 5/2007 | Tsuboshita et al. |
| 2007/0124291 A1 | 5/2007 | Hassan et al. |
| 2007/0136086 A1 | 6/2007 | Luerssen |
| 2007/0143629 A1 | 6/2007 | Hardjono et al. |
| 2007/0180495 A1 | 8/2007 | Hardjono et al. |
| 2007/0214259 A1 | 9/2007 | Ahmed et al. |
| 2007/0220146 A1 | 9/2007 | Suzuki |
| 2007/0282886 A1 | 12/2007 | Purang et al. |
| 2008/0005096 A1 | 1/2008 | Moore |
| 2008/0015916 A1 | 1/2008 | Cossey et al. |
| 2008/0086442 A1 | 4/2008 | Dasdan et al. |
| 2008/0101343 A1 | 5/2008 | Monette et al. |
| 2008/0104225 A1 | 5/2008 | Zhang et al. |
| 2008/0133391 A1 | 6/2008 | Kurian et al. |
| 2008/0183378 A1 | 7/2008 | Weidner |
| 2008/0288612 A1 | 11/2008 | Kwon |
| 2009/0024629 A1 | 1/2009 | Miyauchi |
| 2009/0027392 A1 | 1/2009 | Jadhav et al. |
| 2009/0043489 A1 | 2/2009 | Weidner |
| 2009/0063157 A1 | 3/2009 | Seo |
| 2009/0064293 A1 | 3/2009 | Li et al. |
| 2009/0094134 A1 | 4/2009 | Toomer |
| 2009/0106822 A1 | 4/2009 | Obasanjo et al. |
| 2009/0198562 A1 | 8/2009 | Wiesinger et al. |
| 2009/0276233 A1 | 11/2009 | Brimhall et al. |
| 2009/0296568 A1 | 12/2009 | Kitada |
| 2009/0327054 A1 | 12/2009 | Yao |
| 2010/0004940 A1 | 1/2010 | Choi et al. |
| 2010/0010826 A1 | 1/2010 | Rosenthal et al. |
| 2010/0043055 A1 | 2/2010 | Baumgart |
| 2010/0076987 A1 | 3/2010 | Schreiner |
| 2010/0106557 A1 | 4/2010 | Buss |
| 2010/0169137 A1 | 7/2010 | Jastrebski et al. |
| 2010/0180048 A1 | 7/2010 | Guo et al. |
| 2010/0205541 A1 | 8/2010 | Rapaport et al. |
| 2010/0217525 A1 | 8/2010 | King et al. |
| 2010/0250605 A1 | 9/2010 | Pamu et al. |
| 2010/0262610 A1 | 10/2010 | Acosta et al. |
| 2010/0274815 A1 | 10/2010 | Vanasco |
| 2010/0309915 A1 | 12/2010 | Pirbhai et al. |
| 2011/0029467 A1 | 2/2011 | Spehr et al. |
| 2011/0055897 A1 | 3/2011 | Arasaratnam |

(56) References Cited

U.S. PATENT DOCUMENTS

| | | |
|---|---|---|
| 2011/0113098 A1 | 5/2011 | Walsh et al. |
| 2011/0173344 A1 | 7/2011 | Mihaly et al. |
| 2011/0208866 A1 | 8/2011 | Marmolejo-Meillon et al. |
| 2011/0246237 A1 | 10/2011 | Vdovjak |
| 2011/0246412 A1 | 10/2011 | Skelton |
| 2011/0265011 A1 | 10/2011 | Taylor et al. |
| 2011/0283205 A1 | 11/2011 | Nie et al. |
| 2011/0295626 A1 | 12/2011 | Chen et al. |
| 2012/0182822 A1 | 6/2012 | Hayashi |
| 2012/0182882 A1 | 7/2012 | Chrapko et al. |
| 2012/0197758 A1 | 8/2012 | Zhong et al. |
| 2012/0204265 A1 | 8/2012 | Judge |
| 2012/0282884 A1 | 11/2012 | Sun |
| 2012/0317149 A1 | 12/2012 | Jagota et al. |
| 2012/0317200 A1* | 12/2012 | Chan .................. G06F 17/3064 709/204 |
| 2013/0013807 A1 | 1/2013 | Chrapko et al. |
| 2013/0073387 A1 | 3/2013 | Heath |
| 2013/0097184 A1 | 4/2013 | Berkhim et al. |
| 2013/0110732 A1 | 5/2013 | Uppal |
| 2013/0124542 A1 | 5/2013 | Lee et al. |
| 2013/0166601 A1 | 6/2013 | Chrapko et al. |
| 2013/0173457 A1 | 7/2013 | Chrapko et al. |
| 2013/0198811 A1 | 8/2013 | Yu et al. |
| 2013/0282884 A1 | 10/2013 | Chandrasekaran et al. |
| 2013/0291098 A1 | 10/2013 | Chung et al. |
| 2013/0332740 A1 | 12/2013 | Sauve et al. |
| 2014/0081652 A1 | 3/2014 | Klindworth |
| 2014/0089189 A1 | 3/2014 | Vasireddy |
| 2014/0114962 A1 | 4/2014 | Rosenburg et al. |
| 2014/0156274 A1 | 6/2014 | You et al. |
| 2014/0172708 A1 | 6/2014 | Chrapko et al. |
| 2014/0173723 A1 | 6/2014 | Singla et al. |
| 2014/0258160 A1 | 9/2014 | Chrapko et al. |
| 2014/0278730 A1 | 9/2014 | Muhart et al. |
| 2014/0279352 A1 | 9/2014 | Schaefer et al. |
| 2014/0280151 A1 | 9/2014 | Micaelian |
| 2014/0287725 A1 | 9/2014 | Lee |
| 2014/0317003 A1 | 10/2014 | Shah |
| 2015/0026120 A1 | 1/2015 | Chrapko et al. |
| 2015/0089568 A1 | 3/2015 | Sprague et al. |
| 2015/0121456 A1 | 4/2015 | Milman et al. |
| 2015/0220835 A1 | 8/2015 | Wilson et al. |
| 2015/0271206 A1 | 9/2015 | Schultz et al. |
| 2015/0359039 A1 | 12/2015 | Haque et al. |
| 2015/0370801 A1 | 12/2015 | Shah |
| 2016/0035046 A1 | 2/2016 | Gupta et al. |
| 2016/0073271 A1 | 3/2016 | Schultz et al. |
| 2016/0171011 A1 | 6/2016 | Drogobetski et al. |
| 2016/0171113 A1 | 6/2016 | Fanous et al. |
| 2016/0277424 A1 | 9/2016 | Mawji et al. |
| 2017/0236078 A1 | 8/2017 | Rasumov |

FOREIGN PATENT DOCUMENTS

| | | |
|---|---|---|
| CN | 1619567 A | 5/2005 |
| CN | 101443806 A | 5/2009 |
| EP | 1511232 A1 | 3/2005 |
| JP | 2001-298453 A | 10/2001 |
| JP | 2003-259070 A | 9/2003 |
| JP | 2006-113900 A | 4/2006 |
| JP | 2006-260099 A | 9/2006 |
| JP | 2007-004411 A | 1/2007 |
| JP | 2007-249413 A | 9/2007 |
| JP | 2008-129990 A | 6/2008 |
| JP | 2009-025871 A | 2/2009 |
| JP | 2009-064433 A | 3/2009 |
| JP | 2009-146253 A | 7/2009 |
| WO | 2006/019752 A1 | 2/2006 |
| WO | 2006/115919 A2 | 11/2006 |
| WO | 2009/002193 A1 | 12/2008 |
| WO | 2009/020964 A2 | 2/2009 |
| WO | 2009/109009 A1 | 9/2009 |
| WO | 2010/048172 A1 | 4/2010 |
| WO | 2011/143761 A1 | 11/2011 |
| WO | 2013/026095 A1 | 2/2013 |
| WO | 2013/173790 A1 | 11/2013 |

OTHER PUBLICATIONS

Non-Final Office Action for U.S. Appl. No. 13/521,216, dated Jun. 20, 2014.
Final Office Action for U.S. Appl. No. 131521,216, dated May 21, 2015.
Non-Final Office Action for U.S. Appl. No. 13/521,216, dated Apr. 13, 2016.
Final Office Action for U.S. Appl. No. 13/521,216, dated Oct. 21, 2016.
Final Office Action for U.S. Appl. No. 13/503,352, dated Jan. 5, 2015, 28 pages.
Non-Final Office Action for U.S. Appl. No. 13/503,352, dated Aug. 21, 2014, 24 pages.
Non-Final Office Action for U.S. Appl. No. 13/503,352, dated Aug. 18, 2015, 26 pages.
Non-Final Office Action for U.S. Appl. No. 15/224,063, dated Sep. 1, 2016, 47 pages.
Non-Final Office Action for U.S. Appl. No. 13/695,419, dated Oct. 31, 2014, 20 pages.
Final Office Action for U.S. Appl. No. 13/695,419, dated Jun. 2, 2015, 31 pages.
Non-Final Office Action for U.S. Appl. No. 13/695,419, dated Dec. 17, 2015, 43 pages.
Non-Final Office Action for U.S. Appl. No. 13/695,419, dated Apr. 5, 2016, 72 pages.
Non-Final Office Action for U.S. Appl. No. 13/695,419, dated Oct. 12, 2016, 147 pages.
Non-Final Office Action for U.S. Appl. No. 13/824,324, dated Mar. 9, 2017, 17 pages.
Non-Final Office Action for U.S. Appl. No. 14/664,285, dated Jun. 4, 2015, 25 pages.
Final Office Action for U.S. Appl. No. 14/664,285, dated Sep. 21, 2015, 33 pages.
Non-Final Office Action for U.S. Appl. No. 14/664,285, dated Mar. 4, 2016, 24 pages.
Final Office Action for U.S. Appl. No. 14/664,285, dated Jul. 29, 2016, 29 pages.
Non-Final Office Action for U.S. Appl. No. 15/070,643, dated Aug. 26, 2016, 36 pages.
Non-Final Office Action for U.S. Appl. No. 15/589,841, dated Jun. 5, 2017, 40 pages.
International Search Report and Written Opinion for International Patent Application No. PCT/CA2017/050257 dated May 19, 2017, pages.
International Search Report and Written Opinion for International Patent Application No. PCT/CA2017/050197 dated May 30, 2017, 15 pages.
Non-Final Office Action for U.S. Appl. No. 15/466,590, dated Jul. 13, 2017, 20 pages.
Non-Final Office Action for U.S. Appl. No. 15/055,952, dated Aug. 12, 2016, 33 pages.
International Search Report and Written Opinion for International Patent Application No. PCT/CA2017/050255 dated Jun. 19, 2017, 9 pages.
Non-Final Office Action for U.S. Appl. No. 13/695,419, dated Jun. 14, 2017, 44 pages.
Japanese Office Action dated Jul. 27, 2017, dated Aug. 2, 2017 for Japanese Patent Application No. 2016-131310, 4 pages.
Non-Final Office Action for U.S. Appl. No. 15/224,063, dated Jul. 14, 2017, 36 pages.
Non-Final Office Action for U.S. Appl. No. 15/400,471, dated Aug. 7, 2017, 24 pages.
Non-Final Office Action for U.S. Appl. No. 15/630,299, dated Aug. 10, 2017, 17 pages.
International Search Report and Written Opinion for International Patent Application No. PCT/CA2017/050351 dated Jun. 19, 2017, 10 pages.

(56) References Cited

OTHER PUBLICATIONS

Non-Final Office Action for U.S. Appl. No. 15/671,102 dated Sep. 22, 2017, 21 pages.
Non-Final Office Action for U.S. Appl. No. 15/675,041 dated Oct. 6, 2017, 72 pages.
Canadian Office Action for Canadian Application Serial No. 2,775,899 dated Oct. 12, 2017, 6 pages.
Notice of Allowance for U.S. Appl. No. 13/695,419 dated Nov. 8, 2017, 92 pages.
Final Office Action for U.S. Appl. No. 13/824,324, dated Nov. 30, 2017, 33 pages.
Decision to Grant a Patent and English Translation thereof dated Nov. 14, 2017 for Japanese Patent Application No. 2016-131310, 6 pages.
International Search Report and Written Opinion for International Patent Application No. PCT/CA2010/001531 dated Jan. 10, 2011, 9 pages.
Notification of Reasons for Refusal and English Translation thereof dated Mar. 29, 2016 for Japanese Patent Application No. 2015-085003, 4 pages.
Decision to Grant a Patent and English Translation thereof dated Jun. 2, 2016 for Japanese Patent Application No. 2015-085003, 6 pages.
Notification of Reasons for Refusal and English Translation thereof dated Apr. 3, 2014 for Japanese Patent Application No. 2012-531192, 7 pages.
Decision to Grant a Patent and English Translation thereof dated Feb. 16, 2015 for Japanese Patent Application No. 2012-531192, 6 pages.
Extended European Search Report for European Patent Application No. 10819770.8 dated Oct. 9, 2014, 7 pages.
Communication pursuant to Rules 70(2) for European Patent Application No. 10819770.8 dated Oct. 28, 2014, 1 page.
Communication pursuant to Article 94(3) EPC for European Patent Application No. 10819770.8 dated Feb. 8, 2016, 7 pages.
Decision to Refuse European Patent Application no. 10819770.8 dated Apr. 18, 2017, 6 pages.
Chinese First Office Action and English Translation thereof dated Mar. 24, 2014 for Chinese Application Serial No. 201080051338.X, 31 pages.
Chinese Second Office Action and English Translation thereof dated Jan. 16, 2015 for Chinese Application Serial No. 201080051338.X, 26 pages.
Chinese Third Office Action and English Translation thereof dated Sep. 28, 2015 for Chinese Application Serial No. 201080051338.X, 12 pages.
Angwin et al., "Scrapers' Dig Deep for Data on Web", http://online.wsj.com/article/SB10001424052748703358504575544381288117888.html?, Oct. 12, 2010, printed on Nov. 6, 2010, 5 pages.
Anthes, "The Search Is On-Computerworld," http://www.computerworld.com/s/article/70041IThe_Search_Is_On, Apr. 15, 2002, printed Nov. 6, 2010, 8 pages.
Baras et al., "Dynamic Self-Organization and Clustering in Distributed Networked Systems for Performance Improvement," Proceedings of the 47th annual Allerton conference on Communication, Control, and Computing, Alierton'09, Illinois, USA, pp. 968-975, Sep. 30-Oct. 2, 2009.
Chakraborty et al., "TrustBAC-Integrating Trust Relationships into the RBAC Model for Access Control in Open Systems," Proceedings of the eleventh ACM symposium on Access Control Models and Technologies, SACMAT '06, 10 pages, Jun. 7-9, 2006.
Ding et al., "Transitive Closure and Metric Inequality of Weighted Graphs: Detecting Protein Interaction Modules Using Cliques", Int. J. Data Mining and Bioinformatics, vol. X, No. X, 200X, pp. 162-177, 2006.
"Facebook announces groups, downloading", http://content.usatoday.com/communities/technologylive/post/2010/10/live-facebook-announcesdownloading-other-features/1, Oct. 6, 2010, printed Nov. 6, 2010, 7 pages.

Feldman et al., "Robust Incentive Techniques for Peer-to-Peer Networks", Proceedings of the fifth ACM Conference on Electronic Commerce EC'04, New York, New York, USA, 10 pages, May 17-20, 2004.
Final Office Action for U.S. Appl. No. 15/079,952, dated Dec. 16, 2016, 14 pages.
Gan et al., "A Novel Reputation Computing Model for Mobile Agent-Based E-Commerce Systems", Proceedings of the International Conference on Information Security and Assurance, ISA 2008, pp. 253-260, Apr. 24-26, 2008.
Geisberger, et al., "Contraction Hierarchies: Faster and Simpler Hierarchical Routing in Road Networks", LNCS 5038, 2008, pp. 319-333.
Golbeck et al., "Inferring Trust Relationships in Web-based Social Networks", Journal of ACM Transactions of Internet Technology (TOIT), vol. 6, issue 4, Nov. 2006, 41 pages.
Gu et al., "Processing Massive Sized Graphs Using Sector/Sphere", Proceedings of the 2010 IEEE Workshop on Many-Task Computing on Grids and Supercomputers (MTAGS), New Orleans, LA, USA, 10 pages, Nov. 15, 2010.
Gupta et al., "A Reputation System for Peer-to-Peer Networks," Proceedings of the 13th International Workshop on Network and operating systems support for digital audio and video NOSSDAV'03, Monterey, California, USA, Jun. 1-3 2003.
Gupta et al., "Reputation Management Framework and its use as Currency in large-Scale Peer to-Peer Networks", Proceedings of the Fourth IEEE International Conference on Peer-to-Peer Computing P2P2004, Zurich, Switzerland, pp. 1-9, Aug. 2004.
Hartley et al., "MSSG: A Framework for Massive-Scale Semantic Graphs," Proceedings of 2006 IEEE International Conference on Cluster Computing, CLUSTER'2006, Barcelona, Spain, 10 pages, Sep. 25-28, 2006.
Huynh et al., "An Integrated Trust and reputation model for open multi-Agent systems," Journal of Autonomous Agents and Multi-Agent Systems, vol. 13, issue 2, pp. 119-154, Sep. 2006.
International Search Report and Written Opinion for International Patent Application No. PCT/CA2016/050305 dated Jun. 3, 2016, 7 pages.
Josang et al., "Simplification and Analysis of Transitive Trust Networks", Journal of Web Intelligence and Agent Systems, vol. 4, issue 2, Apr. 2006, pp. 1-26.
Kamola et al., "Reconstruction of a Social Network Graph from Incomplete Call Detail Records", Conference Proceedings of the International Conference on Computational Aspects of SocialNetworks (CASoN), Oct. 19, 2011, pp. 136-140.
Kang et al., "PEGASUS: A Peta-Scale Graph Mining System—Implementation and Observations", Proceedings of the Ninth IEEE International Conference on Data Mining, ICDM'09, Miami, FL,USA, pp. 229-238, Dec. 6-9, 2009.
Kim et al., "Design and Implementation of the location-based Personalized Social Media Service," Conference Proceedings of the International Conference on Internet and Web Applications and Services (ICIW), May 9, 2010, pp. 116-121.
Lumsdaine et al., "Challenges in Parallel Graph Processing", Parallel Processing letters, vol. 17, No. 1, Mar. 2007,16 pages.
Malewicz et al., "Pregel: a System for large-Scale Graph Processing", Proceedings of the 2010 International Conference on Management Data, SIGMOD'10, Indianapolis, Indiana, USA, Jun. 6-11, 2010, pp. 135-145.
Meyer "Outrage as Credit Agency Plans to Mine Facebook Data," Gigaom.com, https://gigaom.com/2012/06/07/credit-agency-mines-facebook-data/ Jun. 7, 2012, 3 pages.
Mining Social Networks, Untangling the social Web, http://www.economist.com/node/16910031?story_id=16910031&fsrc=rss, Sep. 2, 2010, printed Nov. 6, 2010, 5 pages.
Mori et al., "Improving Deployability of Peer-Assisted CDN Platform with Incentive", Proceedings of IEEE Global Telecommunications Conference GLOBECOM 2009, Honolulu, Hawaii, USA, 2009, 7 pages.
Mui et al., "A Computational Model of Trust and Reputation", Proceedings of the 35th Annual Hawaii International Conference on System Sciences, HICSS '02, vol. 7, 2002, 9 pages.

(56) References Cited

OTHER PUBLICATIONS

Notice of Allowance for U.S. Appl. No. 15/224,172, dated Oct. 14, 2016, 35 pages.
Notice of Allowance for U.S. Appl. No. 15/056,484, dated Jul. 13, 2016, 31 pages.
Non-Final Office Action for U.S. Appl. No. 15/079,952, dated Jul. 14, 2016, 26 pages.
Notice of Allowance for U.S. Appl. No. 14/664,285, dated Oct. 7, 2016, 27 pages.
Notice of Allowance for U.S. Appl. No. 15/070,643, dated Apr. 7, 2017, 28 pages.
Notice of Allowance for U.S. Appl. No. 15/406,405, dated Apr. 6, 2017, 27 pages.
Non-Final Office Action for U.S. Appl. No. 15/070,643, dated Feb. 24, 2017, 34 pages.
Safaei et al., "Social Graph Generation & Forecasting Using Social Network Mining", Proceedings of the 33rd Annual IEEE International Computer Software and Applications Conference, COMPSAC '09, 2009, pp. 31-35.
"Startup Wants to Base Your Credit Score on Social Media Profiles", Mashable, Technology Review 7, Jun. 7, 2012, 18 pages.
Taiwanese Office Action for Taiwanese Patent Application No. 105108584 dated Oct. 31, 2016, 7 pages.
Wallentin et al., "A Cross-Layer Route Discovery Strategy for Virtual Currency Systems in Mobile Ad Hoc Networks", Proceedings of the Seventh International Conference on Wireless On-demand Network Systems and Services IEEE/IFIP WONS 2010, Kranjska Gora, Slovenia, 2010, pp. 91-98.
Zetter, "Tracking Terrorists the Las Vegas Way", http://pcworld.about.com/news/Aug072002id103692.htm, printed Nov. 6, 2010, 3 pages.
Zhang et al., "A Review of Incentive Mechanisms in Peer-to-Peer Systems", Proceedings of the First International Conference on Advances in P2P Systems AP2PS'09, Sliema, Malta, 2009, pp. 45-50.
Zhang et al., "MARCH: A Distributed Incentive Scheme for Peer-to-Peer Networks", Proceedings of the 26th Annual IEEE Conference on Computer Communication INFOCOM 2007, Anchorage, Alaska, USA, 2007, pp. 1091-1099.
Non-Final Office Action for U.S. Appl. No. 13/498,429, dated Apr. 17, 2014, 24 pages.
Non-Final Office Action for U.S. Appl. No. 13/498,429, dated Jul. 25, 2014, 18 pages.
Final Office Action for U.S. Appl. No. 13/498,429, dated Jan. 16, 2015, 21 pages.
Non-Final Office Action for U.S. Appl. No. 14/282,935, dated Jul. 21, 2014, 26 pages.
Final Office Action for U.S. Appl. No. 14/282,935, dated Jan. 30, 2015, 42 pages.
Non-Final Office Action for U.S. Appl. No. 14/282,935, dated Aug. 5, 2015, 7 pages.
Final Office Action for U.S. Appl. No. 14/282,935, dated Feb. 12, 2016, 13 pages.
Non-Final Office Action for U.S. Appl. No. 15/254,642, dated Dec. 28, 2016, 29 pages.
EPO. Mitteilung des Europischen Patentamts vom 1. Oct. 2007 ber Geschftsmethoden = Notice from the Europea Patent Office dated Oct. 1, 2007 concerning business methods = Communiqu de l'Office europen des brevets,en date du Oct. 1, 2007, concemant les mthodes dans le domaine des activites economiques. vol. 30,Nr:11,pp. 592-593. Journal Officiel De L'Office Europeen Des Brevets.Official Journal of the European Patent Office.Amtsblattt Des Europaeischen Patenta, Nov. 1, 2007 OEB, Munchen, DE.
Notification to Grant Patent Right for Invention and English Translation thereof dated Mar. 22, 2016 for Chinese Application Serial No. 201080051338.X, 4 pages.
International Search Report and Written Opinion for International Patent Application No. PCT/CA2011/050017 dated Apr. 13, 2011, 9 pages.
International Search Report and Written Opinion for International Patent Application No. PCT/CA2010/001658 dated Jan. 26, 2011, 9 pages.
International Search Report and Written Opinion for International Patent Application No. PCT/CA2011/050260 dated Jul. 26, 2011, 7 pages.
Final Office Action dated Dec. 15, 2017 for U.S. Appl. No. 15/224,063, 52 pages.
Non-Final Office Action dated Dec. 15, 2017 for U.S. Appl. No. 15/589,841, 66 pages.
Final Office Action dated Jan. 19, 2018 for U.S. Appl. No. 15/466,590, 56 pages.
Final Office Action dated Jan. 26, 2018 for U.S. Appl. No. 15/400,471, 78 pages.
Final Office Action dated Feb. 8, 2018, for U.S. Appl. No. 15/630,299, 40 pages.
International Search Report and Written Opinion for International Patent Application No. PCT/CA2017/050962 dated Nov. 20, 2017, 9 pages.
Non-Final Office Action received for U.S. Appl. No. 15/644,356, dated Apr. 5, 2018, 74 pages.
Notice of Allowance received for U.S. Appl. No. 15/589,841, dated Mar. 20, 2018, 44 pages.
Non-Final Office Action received for U.S. Appl. No. 15/046,041, dated Apr. 26, 2018, 70 pages.
Non-Final Office Action received for U.S. Appl. No. 15/907,164, dated May 24, 2018 29 pages.
Final Office Action received for U.S. Appl. No. 15/675,041 dated May 17, 2018, 73 pages.
Non-Final Office Action received for U.S. Appl. No. 15/400,471, dated May 29, 2018, 34 pages.
Non-Final Office Action received for U.S. Appl. No. 15/630,299, dated May 17, 2018,19 pages.
First Action Interview Pilot Program Pre-Interview Communication for U.S. Appl. No. 15/907,166 dated Jul. 6, 2018, 6 pages.
Final Office Action for U.S. Appl. No. 15/400,471 dated Oct. 29, 2018, 42 pages.
Final Office Action for U.S. Appl. No. 15/644,356 dated Oct. 18, 2018, 41 pages.
Non-Final Office Action for U.S. Appl. No. 16/014,032 dated Oct. 4, 2018, 74 pages.
First Action Interview Pilot Program Communication for U.S. Appl. No. 15/907,166 dated Oct. 31, 2018, 46 pages.
Final Office Action for U.S. Appl. No. 15/907,164 dated Nov. 14, 2018, 70 pages.
Chinese First Office Action and English Translation thereof dated Sep. 4, 2018 for Chinese Application Serial No. 201610392926.9, 17 pages.
Final Office Action for U.S. Appl. No. 15/046,041 dated Nov. 20, 2018, 32 pages.

* cited by examiner

SCORING USING DISTRIBUTED DATABASE WITH ENCRYPTED COMMUNICATIONS FOR CREDIT-GRANTING AND IDENTIFICATION VERIFICATION

CROSS-REFERENCE TO RELATED APPLICATIONS

This application is a continuation of U.S. patent application Ser. No. 15/623,103, filed Jun. 14, 2017 entitled "SOCIAL GRAPH DATA ANALYTICS" which a continuation of U.S. patent Ser. No. 15/224,063, filed on Jul. 29, 2016 entitled "SOCIAL GRAPH DATA ANALYTICS", which is a continuation of U.S. patent application Ser. No. 13/503,352, filed Aug. 28, 2012, entitled "SOCIAL GRAPH DATA ANALYTICS", which is a national stage filing under 35 U.S.C. § 371 of International Application No. PCT/CA2010/001658, filed Oct. 22, 2010, which claims the benefit to U.S. Provisional Application Ser. No. 61/254,313, filed Oct. 23, 2009. The above applications are incorporated herein by reference.

BACKGROUND OF THE INVENTION

This invention relates generally to networks of individuals and/or entities and network communities and, more particularly, to systems and methods for determining trust scores or connectivity within or between individuals and/or entities or networks of individuals and/or entities.

The connectivity, or relationships, of an individual or entity within a network community may be used to infer attributes of that individual or entity. For example, an individual or entity's connectivity within a network community may be used to determine the identity of the individual or entity (e.g., used to make decisions about identity claims and authentication), the trustworthiness or reputation of the individual or entity, or the membership, status, and/or influence of that individual or entity in a particular community or subset of a particular community.

An individual or entity's connectivity within a network community, however, is difficult to quantify. For example, network communities may include hundreds, thousands, millions, billions or more members. Each member may possess varying degrees of connectivity information about itself and possibly about other members of the community. Some of this information may be highly credible or objective, while other information may be less credible and subjective. In addition, connectivity information from community members may come in various forms and on various scales, making it difficult to meaningfully compare one member's "trustworthiness" or "competence" and connectivity information with another member's "trustworthiness" or "competence" and connectivity information. Also, many individuals may belong to multiple communities, further complicating the determination of a quantifiable representation of trust and connectivity within a network community. Even if a quantifiable representation of an individual's connectivity is determined, it is often difficult to use this representation in a meaningful way to make real-world decisions about the individual (e.g., whether or not to trust the individual).

Further, it may be useful for these real-world decisions to be made prospectively (i.e., in advance of an anticipated event). Such prospective analysis may be difficult as an individual or entity's connectivity within a network community may change rapidly as the connections between the individual or entity and others in the network community may change quantitatively or qualitatively. This analysis becomes increasingly complex as if applied across multiple communities.

SUMMARY OF THE INVENTION

In view of the foregoing, systems and methods are provided for determining the connectivity between nodes within a network community and inferring attributes, such as trustworthiness or competence, from the connectivity. Connectivity may be determined, at least in part, using various graph traversal and normalization techniques described in more detail below and in U.S. Provisional Patent Application Ser. No. 61/247,343, filed Sep. 30, 2009, U.S. Provisional Patent Application Ser. No. 61/254,313, filed Oct. 23, 2009 and International Patent Application No. CA2010001531, which are hereby incorporated by reference herein in their entirety.

In an embodiment, a path counting approach may be used where processing circuitry is configured to count the number of paths between a first node $n_1$ and a second node $n_2$ within a network community. A connectivity rating $R_{n_1 n_2}$ may then be assigned to the nodes. The assigned connectivity rating may be proportional to the number of subpaths, or relationships, connecting the two nodes, among other possible measures. Using the number of subpaths as a measure, a path with one or more intermediate nodes between the first node $n_1$ and the second node $n_2$ may be scaled by an appropriate number (e.g., the number of intermediate nodes) and this scaled number may be used to calculate the connectivity rating.

In some embodiments, weighted links are used in addition or as an alternative to the subpath counting approach. Processing circuitry may be configured to assign a relative user weight to each path connecting a first node $n_1$ and a second node $n_2$ within a network community. A user connectivity value may be assigned to each link. For example, a user or entity associated with node $n_1$ may assign user connectivity values for all outgoing paths from node $n_1$. In some embodiments, the connectivity values assigned by the user or entity may be indicative of that user or entity's trust in the user or entity associated with node $n_2$. The link values assigned by a particular user or entity may then be compared to each other to determine a relative user weight for each link.

The relative user weight for each link may be determined by first computing the average of all the user connectivity values assigned by that user or node (i.e., the out-link values). If $t_i$ is the user connectivity value assigned to link i, then the relative user weight, $w_i$, assigned to that link may be given in accordance with:

$$w_i = 1 + (t_i - \bar{t}_i)^2 \tag{1}$$

In some embodiments, an alternative relative user weight, $w_i'$, may be used based on the number of standard deviations, σ, the user connectivity value differs from the average value assigned by that user or node. For example, the alternative relative user weight may be given in accordance with:

$$w_i' = 1 - \frac{1}{2+k^2} \text{ where } k = \begin{cases} 0, \text{ if } \sigma = 0 \\ \frac{t_i - \bar{t}_i}{\sigma}, \text{ otherwise} \end{cases} \tag{2}$$

To determine the overall weight of a path, in some embodiments, the weights of all the links along the path may be multiplied together. The overall path weight may then be given in accordance with:

$$w_{path} = \Pi(w_i) \quad (3)$$

or $$w_{path} = \Pi(w_i^t) \quad (4)$$

The connectivity value for the path may then be defined as the minimum user connectivity value of all the links in the path multiplied by the overall path weight in accordance with:

$$t_{path} = w_{path} \times t_{min} \quad (5)$$

In some embodiments, only "qualified" paths are used to determine connectivity values. A qualified path may be a path whose path weight is greater than or equal to some threshold value. As described in more detail below, any suitable threshold function may be used to define threshold values. The threshold function may be based, at least in some embodiments, on empirical data, desired path keep percentages, or both. In some embodiments, threshold values may depend on the length, l, of the path. For example, an illustrative threshold function specifying the minimum path weight for path p may be given in accordance with:

$$threshold(p) = \begin{cases} 0.5, & \text{if } l = 1 \\ 0.428, & \text{if } l = 2 \\ 0.289, & \text{if } l = 3 \\ 0.220, & \text{if } l = 4 \\ 0.216, & \text{if } l = 5 \\ 0.192, & \text{if } l = 6 \end{cases} \quad (6)$$

To determine path connectivity values, in some embodiments, a parallel computational framework or distributed computational framework (or both) may be used. For example, in one embodiment, a number of core processors implement an Apache Hadoop or Google MapReduce cluster. This cluster may perform some or all of the distributed computations in connection with determining new path link values and path weights.

The processing circuitry may identify a changed node within a network community. For example, a new outgoing link may be added, a link may be removed, or a user connectivity value may have been changed. In response to identifying a changed node, in some embodiments, the processing circuitry may re-compute link, path, and weight values associated with some or all nodes in the implicated network community or communities.

In some embodiments, only values associated with affected nodes in the network community are recomputed after a changed node is identified. If there exists at least one changed node in the network community, the changed node or nodes may first undergo a prepare process. The prepare process may include a "map" phase and "reduce" phase. In the map phase of the prepare process, the prepare process may be divided into smaller sub-processes which are then distributed to a core in the parallel computational framework cluster. For example, each node or link change (e.g., tail to out-link change and head to in-link change) may be mapped to a different core for parallel computation. In the reduce phase of the prepare process, each out-link's weight may be determined in accordance with equation (1). Each of the out-link weights may then be normalized by the sum of the out-link weights (or any other suitable value). The node table may then be updated for each changed node, its in-links, and its out-links.

After the changed nodes have been prepared, the paths originating from each changed node may be calculated. Once again, a "map" and "reduce" phase of this process may be defined. During this process, in some embodiments, a depth-first search may be performed of the node digraph or node tree. All affected ancestor nodes may then be identified and their paths recalculated.

In some embodiments, to improve performance, paths may be grouped by the last node in the path. For example, all paths ending with node $n_1$ may be grouped together, all paths ending with node $n_2$ may be grouped together, and so on. These path groups may then be stored separately (e.g., in different columns of a single database table). In some embodiments, the path groups may be stored in columns of a key-value store implementing an HBase cluster (or any other compressed, high performance database system, such as BigTable).

In some embodiments, one or more threshold functions may be defined. The threshold function or functions may be used to determine the maximum number of links in a path that will be analyzed in a connectivity determination or connectivity computation. Threshold factors may also be defined for minimum link weights, path weights, or both. Weights falling below a user-defined or system-defined threshold may be ignored in a connectivity determination or connectivity computation, while only weights of sufficient magnitude may be considered.

In some embodiments, a user connectivity value may represent the degree of trust between a first node and a second node. In one embodiment, node $n_1$ may assign a user connectivity value of $l_1$ to a link between it and node $n_2$. Node $n_2$ may also assign a user connectivity value of $l_2$ to a reverse link between it and node $n_1$. The values of $l_1$ and $l_2$ may be at least partially subjective indications of the trustworthiness of the individual or entity associated with the node connected by the link. For example, one or more of the individual or entity's reputation within the network community (or some other community), the individual or entity's alignment with the trusting party (e.g., political, social, or religious alignment), past dealings with the individual or entity, and the individual or entity's character and integrity (or any other relevant considerations) may be used to determine a partially subjective user connectivity value indicative of trust. A user (or other individual authorized by the node) may then assign this value to an outgoing link connecting the node to the individual or entity. Objective measures (e.g., data from third-party ratings agencies or credit bureaus) may also be used, in some embodiments, to form composite user connectivity values indicative of trust. The subjective, objective, or both types of measures may be automatically harvested or manually inputted for analysis.

In some embodiments, a decision-making algorithm may access the connectivity values in order to make automatic decisions (e.g., automatic network-based decisions, such as authentication or identity requests) on behalf of a user. Connectivity values may additionally or alternatively be outputted to external systems and processes located at third-parties. The external systems and processes may be configured to automatically initiate a transaction (or take some particular course of action) based, at least in part, on received connectivity values. For example, electronic or online advertising may be targeted to subgroups of members of a network community based, at least in part, on network connectivity values.

In some embodiments, a decision-making algorithm may access the connectivity values to make decisions prospectively (e.g., before an anticipated event like a request for credit). Such decisions may be made at the request of a user, or as part of an automated process (e.g., a credit bureau's periodic automated analysis of a database of customer information). This prospective analysis may allow for the initiation of a transaction (or taking of some particular action) in a fluid and/or dynamic manner.

In some embodiments, connectivity values may be used to present information to the user. This information may include, but is not limited to, static and/or interactive visualizations of connectivity values within a user's associated network community or communities. In some embodiments, this information may allow the user to explore or interact with an associated network community or communities, and encourage and/or discourage particular interactions within a user's associated network community or communities. In some embodiments, this information may explicitly present the user with the connectivity values. For example, a percentage may indicate how trustworthy another individual and/or entity is to a user. In some embodiments, the information may implicitly present the user with a representation of the connectivity values. For example, an avatar representing another individual and/or entity may change in appearance based on how trustworthy that individual and/or entity is to a user.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION

Systems and methods for determining the connectivity between nodes in a network community are provided. As defined herein, a "node" may include any user terminal, network device, computer, mobile device, access point, robot, or any other electronic device capable of being uniquely identified within a network community. For example, nodes may include robots (or other machines) assigned unique serial numbers or network devices assigned unique network addresses. In some embodiments, a node may also represent an individual human being, entity (e.g., a legal entity, such as a public or private company, corporation, limited liability company (LLC), partnership, sole proprietorship, or charitable organization), concept (e.g., a social networking group), animal, or inanimate object (e.g., a car, aircraft, or tool). As also defined herein, a "network community" may include a collection of nodes and may represent any group of devices, individuals, or entities.

For example, all or some subset of the users of a social networking website or social networking service (or any other type of website or service, such as an online gaming community) may make up a single network community. Each user may be represented by a node in the network community. As another example, all the subscribers to a particular newsgroup or distribution list may make up a single network community, where each individual subscriber may be represented by a node in the network community. Any particular node may belong in zero, one, or more than one network community, or a node may be banned from all, or a subset of, the community. To facilitate network community additions, deletions, and link changes, in some embodiments a network community may be represented by a directed graph, or digraph, weighted digraph, tree, or any other suitable data structure.

Figure 1:
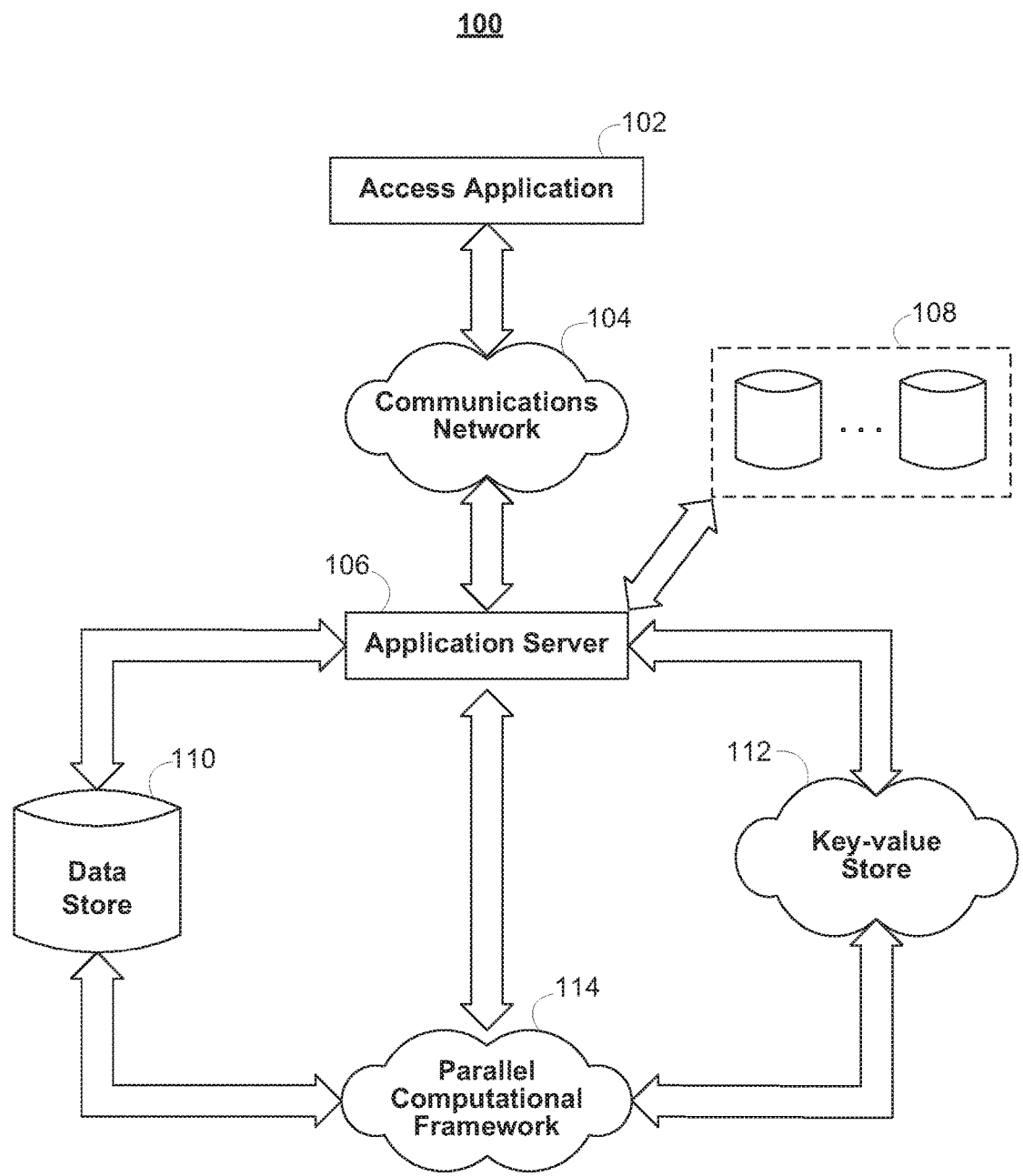
FIG. 1 is an illustrative block diagram of a network architecture used to support connectivity within a network community in accordance with one embodiment of the invention.

FIG. 1 shows illustrative network architecture 100 used to support the connectivity determinations within a network community. A user may utilize access application 102 to access application server 106 over communications network 104. For example, access application 102 may include a standard web browser, application server 106 may include a web server, and communication network 106 may include the Internet. Access application 102 may also include proprietary applications specifically developed for one or more platforms or devices. For example, access application 102 may include one or more instances of an Apple iOS, Android, or WebOS application or any suitable application for use in accessing application 106 over communications network 104. Multiple users may access application service 106 via one or more instances of access application 102. For example, a plurality of mobile devices may each have an instance of access application 102 running locally on the devices. One or more users may use an instance of access application 102 to interact with application server 106.

Communication network 104 may include any wired or wireless network, such as the Internet, WiMax, wide area cellular, or local area wireless network. Communication network 104 may also include personal area networks, such as Bluetooth and infrared networks. Communications on communications network 104 may be encrypted or otherwise secured using any suitable security or encryption protocol.

Application server 106, which may include any network server or virtual server, such as a file or web server, may access data sources 108 locally or over any suitable network connection. Application server 106 may also include processing circuitry (e.g., one or more microprocessors), memory (e.g., RAM, ROM, and hybrid types of memory), storage devices (e.g., hard drives, optical drives, and tape drives). The processing circuitry included in application server 106 may execute a server process for supporting the network connectivity determinations of the present invention, while access application 102 executes a corresponding client process. The processing circuitry included in application server 106 may also perform any of the calculations and computations described herein in connection with determining network connectivity. In some embodiments, a computer-readable medium with computer program logic recorded thereon is included within application server 106. The computer program logic may determine the connectivity between two or more nodes in a network community and it may or may not output such connectivity to a display screen or data store.

For example, application server 106 may access data sources 108 over the Internet, a secured private LAN, or any other communications network. Data sources 108 may include one or more third-party data sources, such as data from third-party social networking services, third-party ratings bureaus, and document issuers (e.g., driver's license and license plate issuers, such as the Department of Motor Vehicles). For example, data sources 108 may include user and relationship data (e.g., "friend" or "follower" data) from one or more of Facebook, MySpace, openSocial. Friendster, Bebo, hi5, Orkut, PerfSpot, Yahoo! 360, Gmail, Yahoo! Mail, Hotmail, other email-based services and accounts, LinkedIn, Twitter, Google Buzz, Really Simple Syndication readers, or any other social networking website or information service. Data sources 108 may also include data stores and databases local to application server 106 containing relationship information about users accessing application server 106 via access application 102 (e.g., databases of addresses, legal records, transportation passenger lists, gambling patterns, political affiliations, vehicle license plate or identification numbers, universal product codes, news articles, business listings, and hospital or university affiliations).

Application server 106 may be in communication with one or more of data store 110, key-value store 112, and parallel computational framework 114. Data store 110, which may include any relational database management system (RDBMS), file server, or storage system, may store information relating to one or more network communities. For example, one or more of data tables 300 (FIG. 3A) may be stored on data store 110. Data store 110 may store identity information about users and entities in the network community, an identification of the nodes in the network community, user link and path weights, user configuration settings, system configuration settings, and/or any other suitable information. There may be one instance of data store 110 per network community, or data store 110 may store information relating to a plural number of network communities. For example, data store 110 may include one database per network community, or one database may store information about all available network communities (e.g., information about one network community per database table).

Parallel computational framework 114, which may include any parallel or distributed computational framework or cluster, may be configured to divide computational jobs into smaller jobs to be performed simultaneously, in a distributed fashion, or both. For example, parallel computational framework 114 may support data-intensive distributed applications by implementing a map/reduce computational paradigm where the applications may be divided into a plurality of small fragments of work, each of which may be executed or re-executed on any core processor in a cluster of cores. A suitable example of parallel computational framework 114 includes an Apache Hadoop cluster.

Parallel computational framework 114 may interface with key-value store 112, which also may take the form of a cluster of cores. Key-value store 112 may hold sets of key-value pairs for use with the map/reduce computational paradigm implemented by parallel computational framework 114. For example, parallel computational framework 114 may express a large distributed computation as a sequence of distributed operations on data sets of key-value pairs. User-defined map/reduce jobs may be executed across a plurality of nodes in the cluster. The processing and computations described herein may be performed, at least in part, by any type of processor or combination of processors. For example, various types of quantum processors (e.g., solid-state quantum processors and light-based quantum processors), artificial neural networks, and the like may be used to perform massively parallel computing and processing.

In some embodiments, parallel computational framework 114 may support two distinct phases, a "map" phase and a "reduce" phase. The input to the computation may include a data set of key-value pairs stored at key-value store 112. In the map phase, parallel computational framework 114 may split, or divide, the input data set into a large number of fragments and assign each fragment to a map task. Parallel computational framework 114 may also distribute the map tasks across the cluster of nodes on which it operates. Each map task may consume key-value pairs from its assigned fragment and produce a set of intermediate key-value pairs. For each input key-value pair, the map task may invoke a user defined map function that transmutes the input into a different key-value pair. Following the map phase, parallel computational framework 114 may sort the intermediate data set by key and produce a collection of tuples so that all the values associated with a particular key appear together. Parallel computational framework 114 may also partition the collection of tuples into a number of fragments equal to the number of reduce tasks.

In the reduce phase, each reduce task may consume the fragment of tuples assigned to it. For each such tuple, the reduce task may invoke a user-defined reduce function that transmutes the tuple into an output key-value pair. Parallel computational framework 114 may then distribute the many reduce tasks across the cluster of nodes and provide the appropriate fragment of intermediate data to each reduce task.

Tasks in each phase may be executed in a fault-tolerant manner, so that if one or more nodes fail during a computation the tasks assigned to such failed nodes may be redistributed across the remaining nodes. This behavior may allow for load balancing and for failed tasks to be re-executed with low runtime overhead.

Key-value store 112 may implement any distributed file system capable of storing large files reliably. For example key-value store 112 may implement Hadoop's own distributed file system (DFS) or a more scalable column-oriented distributed database, such as HBase. Such file systems or databases may include BigTable-like capabilities, such as support for an arbitrary number of table columns.

Figure 2:
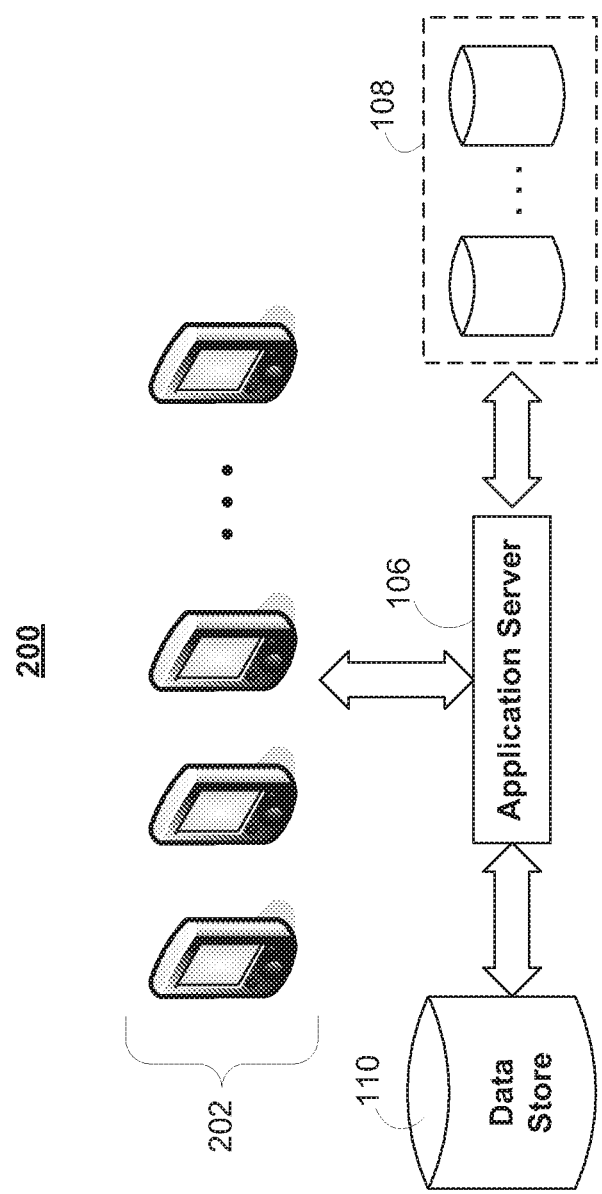
FIG. 2 is another illustrative block diagram of a network architecture used to support connectivity within a network community in accordance with one embodiment of the invention.

Although FIG. 1, in order to not over-complicate the drawing, only shows a single instance of access application 102, communications network 104, application server 106, data source 108, data store 110, key-value store 112, and parallel computational framework 114, in practice network architecture 100 may include multiple instances of one or more of the foregoing components. In addition, key-value store 112 and parallel computational framework 114 may also be removed, in some embodiments. As shown in network architecture 200 of FIG. 2, the parallel or distributed computations carried out by key-value store 112 and/or parallel computational framework 114 may be additionally or alternatively performed by a cluster of mobile devices 202 instead of stationary cores. In some embodiments, cluster of mobile devices 202, key-value store 112, and parallel computational framework 114 are all present in the network architecture. Certain application processes and computations may be performed by cluster of mobile devices 202 and certain other application processes and computations may be performed by key-value store 112 and parallel computational framework 114. In addition, in some embodiments, communication network 104 itself may perform some or all of the application processes and computations. For example, specially-configured routers or satellites may include processing circuitry adapted to carry out some or all of the application processes and computations described herein.

Cluster of mobile devices 202 may include one or more mobile devices, such as PDAs, cellular telephones, mobile computers, or any other mobile computing device. Cluster of mobile devices 202 may also include any appliance (e.g., audio/video systems, microwaves, refrigerators, food processors) containing a microprocessor (e.g., with spare processing time), storage, or both. Application server 106 may instruct devices within cluster of mobile devices 202 to perform computation, storage, or both in a similar fashion as would have been distributed to multiple fixed cores by parallel computational framework 114 and the map/reduce computational paradigm. Each device in cluster of mobile devices 202 may perform a discrete computational job, storage job, or both. Application server 106 may combine the results of each distributed job and return a final result of the computation.

Figure 3A:
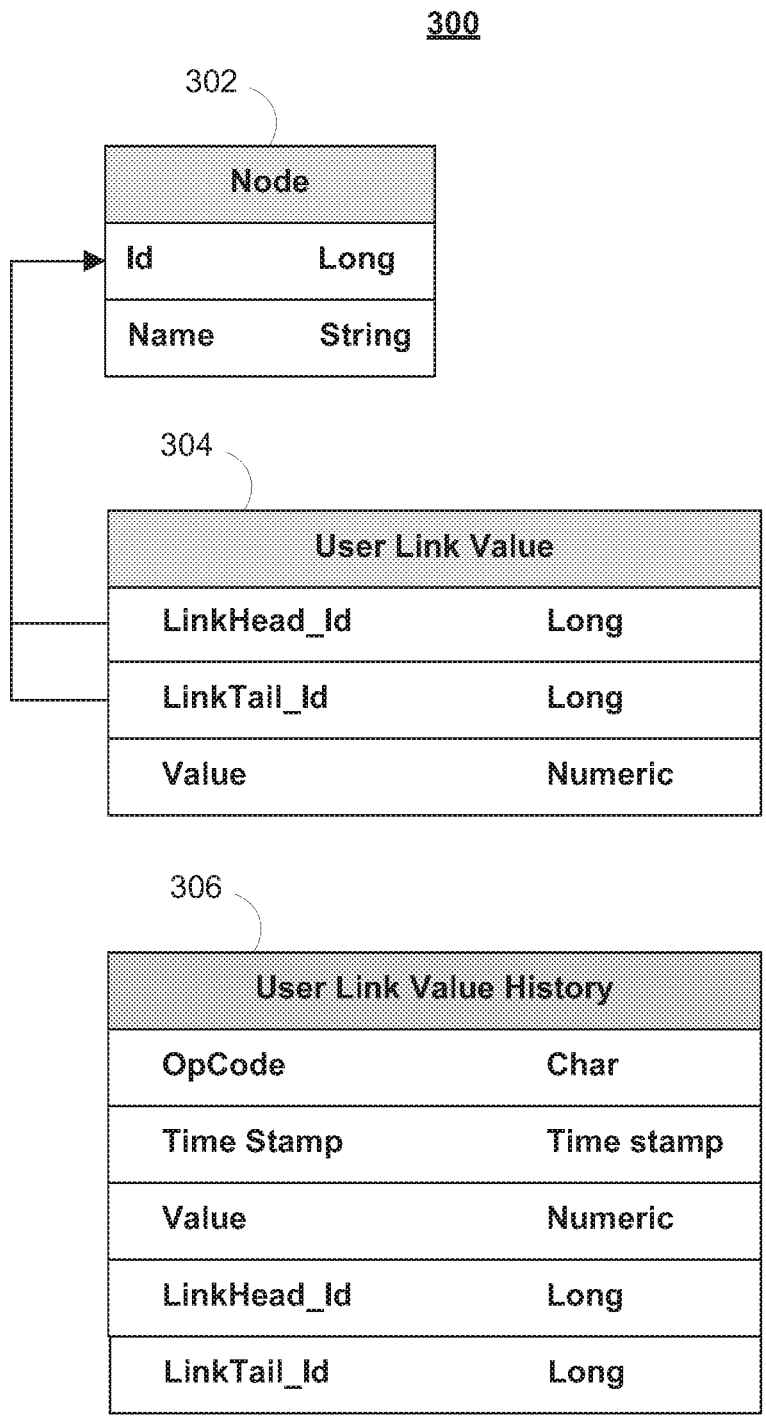
FIGS. 3A and 3B show illustrative data tables for supporting connectivity determinations within a network community in accordance with one embodiment of the invention.

FIG. 3A shows illustrative data tables 300 used to support the connectivity determinations of the present invention. One or more of tables 300 may be stored in for example, a relational database in data store 110 (FIG. 1). Table 302 may store an identification of all the nodes registered in the network community. A unique identifier may be assigned to each node and stored in table 302. In addition, a string name may be associated with each node and stored in table 302. As described above, in some embodiments, nodes may represent individuals or entities, in which case the string name may include the individual or person's first and/or last name, nickname, handle, or entity name.

Table 304 may store user connectivity values. In some embodiments, user connectivity values may be assigned automatically by the system (e.g., by application server 106 (FIG. 1)). For example, application server 106 (FIG. 1) may monitor all electronic interaction (e.g., electronic communication, electronic transactions, or both) between members of a network community. In some embodiments, a default user connectivity value (e.g., the link value 1) may be assigned initially to all links in the network community. After electronic interaction is identified between two or more nodes in the network community, user connectivity values may be adjusted upwards or downwards depending on the type of interaction between the nodes and the result of the interaction. For example, each simple email exchange between two nodes may automatically increase or decrease the user connectivity values connecting those two nodes by a fixed amount. More complicated interactions (e.g., product or service sales or inquires) between two nodes may increase or decrease the user connectivity values connecting those two nodes by some larger fixed amount. In some embodiments, user connectivity values between two nodes may always be increased unless a user or node indicates that the interaction was unfavorable, not successfully completed, or otherwise adverse. For example, a transaction may not have been timely executed or an email exchange may have been particularly displeasing. Adverse interactions may automatically decrease user connectivity values while all other interactions may increase user connectivity values (or have no effect). In addition, user connectivity values may be automatically harvested using outside sources. For example, third-party data sources (such as ratings agencies and credit bureaus) may be automatically queried for connectivity information. This connectivity information may include completely objective information, completely subjective information, composite information that is partially objective and partially subjective, any other suitable connectivity information, or any combination of the foregoing.

In some embodiments, user connectivity values may be manually assigned by members of the network community. These values may represent, for example, the degree or level of trust between two users or nodes or one node's assessment of another node's competence in some endeavor. As described above, user connectivity values may include a subjective component and an objective component in some embodiments. The subjective component may include a trustworthiness "score" indicative of how trustworthy a first user or node finds a second user, node, community, or subcommunity. This score or value may be entirely subjective and based on interactions between the two users, nodes, or communities. A composite user connectivity value including subjective and objective components may also be used. For example, third-party information may be consulted to form an objective component based on, for example, the number of consumer complaints, credit score, socio-economic factors (e.g., age, income, political or religions affiliations, and criminal history), or number of citations/hits in the media or in search engine searches. Third-party information may be accessed using communications network 104 (FIG. 1). For example, a third-party credit bureau's database may be polled or a personal biography and background information, including criminal history information, may be accessed from a third-party database or data source (e.g., as part of data sources 108 (FIG. 1) or a separate data source) or input directly by a node, user, or system administrator.

Table 304 may store an identification of a link head, link tail, and user connectivity value for the link. Links may or may not be bidirectional. For example, a user connectivity value from node $n_1$ to node $n_2$ may be different (and completely separate) than a link from node $n_2$ to node $n_1$. Especially in the trust context described above, each user can assign his or her own user connectivity value to a link (i.e., two users need not trust each other an equal amount in some embodiments).

Table 306 may store an audit log of table 304. Table 306 may be analyzed to determine which nodes or links have changed in the network community. In some embodiments, a database trigger is used to automatically insert an audit record into table 306 whenever a change of the data in table 304 is detected. For example, a new link may be created, a link may be removed, or a user connectivity value may be changed. This audit log may allow for decisions related to connectivity values to be made prospectively (i.e., before an anticipated event). Such decisions may be made at the request of a user, or as part of an automated process, such as the processes described below with respect to FIG. 5. This prospective analysis may allow for the initiation of a transaction (or taking of some particular action) in a fluid and/or dynamic manner. After such a change is detected, the trigger may automatically create a new row in table 306. Table 306 may store an identification of the changed node, and identification of the changed link head, changed link tail, and the user connectivity value to be assigned to the changed link. Table 306 may also store a timestamp indicative of the time of the change and an operation code. In some embodiments, operation codes may include "insert," "update." or "delete" operations, corresponding to whether a link was inserted, a user connectivity value was changed, or a link was deleted, respectively. Other operation codes may be used in other embodiments.

Figure 3B:
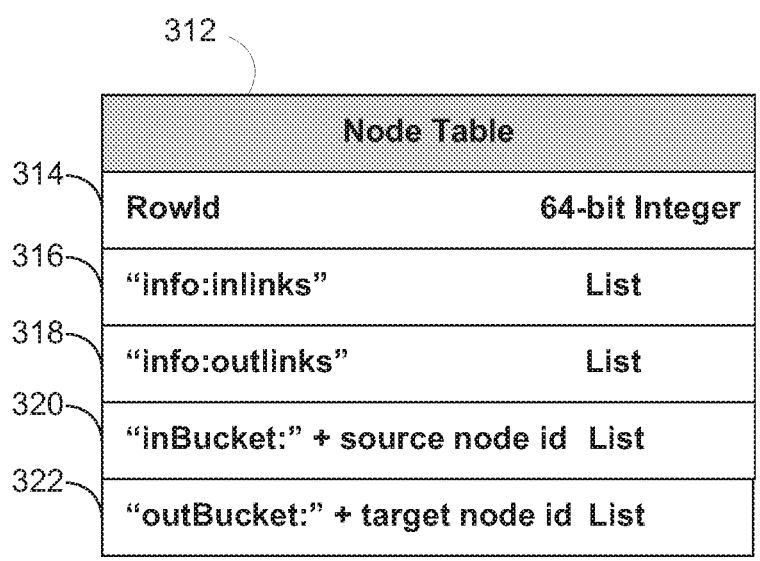

FIG. 3B shows illustrative data structure 310 used to support the connectivity determinations of the present invention. In some embodiments, data structure 310 may be stored using key-value store 112 (FIG. 1), while tables 300 are stored in data store 110 (FIG. 1). As described above, key-value store 112 (FIG. 1) may implement an HBase storage system and include BigTable support. Like a traditional relational database management system, the data shown in FIG. 3B may be stored in tables. However, the BigTable support may allow for an arbitrary number of columns in each table, whereas traditional relational database management systems may require a fixed number of columns.

Data structure 310 may include node table 312. In the example shown in FIG. 3B, node table 312 includes several columns. Node table 312 may include row identifier column 314, which may store 64-bit, 128-bit, 256-bit, 512-bit, or 1024-bit integers and may be used to uniquely identify each row (e.g., each node) in node table 312. Column 316 may include a list of all the incoming links for the current node. Column 318 may include a list of all the outgoing links for the current node. Node table 312 may also include one or more "bucket" columns 320 and 322. These columns may store a list of paths that connect, for example, a source node to the current node, the current node to a target node, or both. As described above, grouping paths by the last node in the path (e.g., the target node), the first node in the path (e.g., the source node), or both, may facilitate connectivity computations. As shown in FIG. 3B, in some embodiments, to facilitate scanning, bucket column names may include the target node identifier appended to the end of the "bucket:" column name.

Figure 4A:
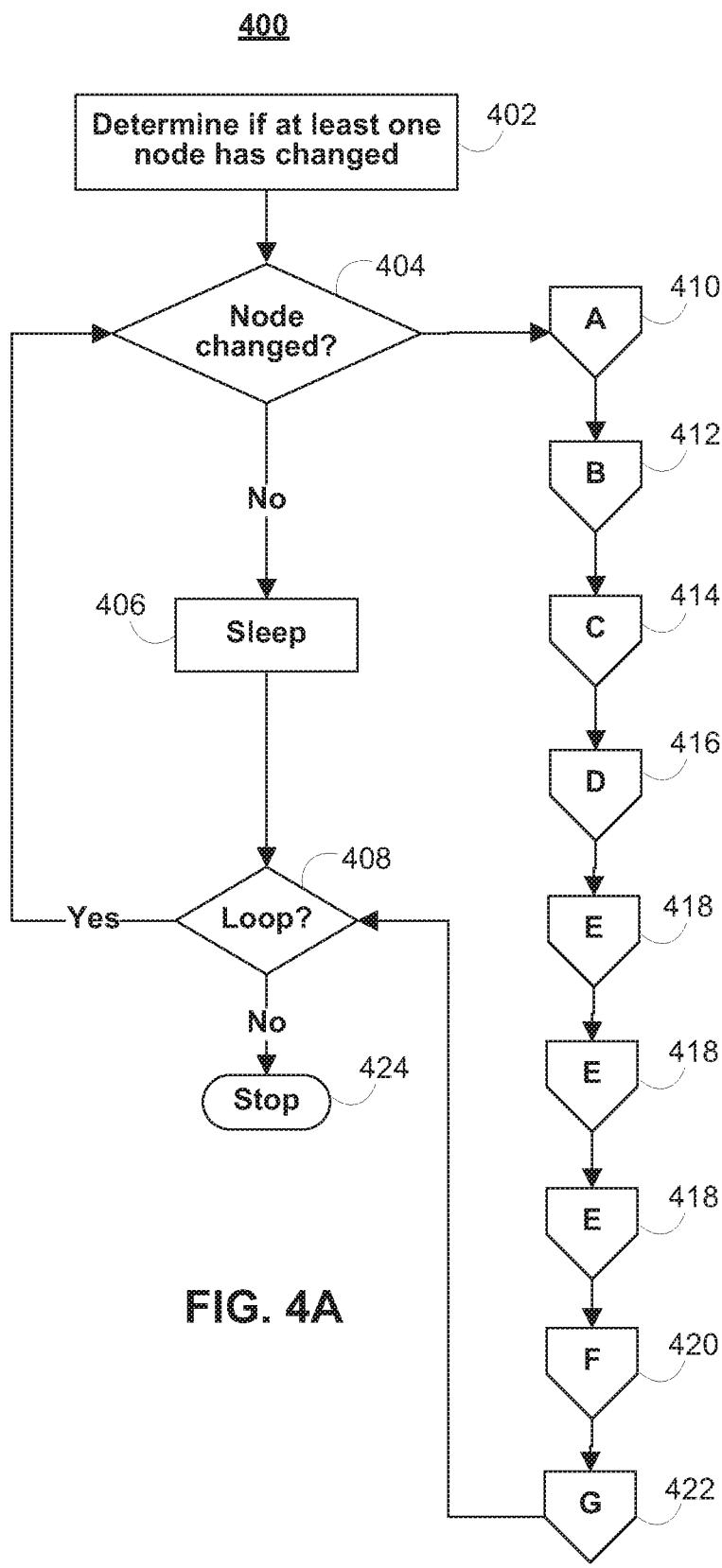
FIGS. 4A-4H show illustrative processes for supporting connectivity determinations within a network community in accordance with one embodiment of the invention.

FIGS. 4A-4H show illustrative processes for determining the connectivity of nodes within a network community. FIG. 4A shows process 400 for updating a connectivity graph (or any other suitable data structure) associated with a network community. As described above, in some embodiments, each network community is associated with its own connectivity graph, digraph, tree, or other suitable data structure. In other embodiments, a plurality of network communities may share one or more connectivity graphs (or other data structure).

In some embodiments, the processes described with respect to FIG. 4A-4H may be executed to make decisions prospectively (i.e., before an anticipated event). Such decisions may be made at the request of a user, or as part of an automated process, such as the processes described below with respect to FIG. 5. This prospective analysis may allow for the initiation of a transaction (or taking of some particular action) in a fluid and/or dynamic manner.

In some embodiments, the processes described with respect to FIG. 4A-4H may be executed to provide information to a user. Such presentations may be made at the request of a user, or as part of an automated presentation. This information may include, but is not limited to, static and/or interactive visualizations of connectivity values within a user's associated network community or communities. In some embodiments, this information may be integrated into explorations of or interactions within a user's associated network community or communities. Providing this information to a user may allow the user to better understand what other individuals and/or entities they may trust within a network community, and/or may encourage and/or discourage particular interactions within a user's associated network community or communities.

At step 402, a determination is made whether at least one node has changed in the network community. As described above, an audit record may be inserted into table 306 (FIG. 3) after a node has changed. By analyzing table 306 (FIG. 3), a determination may be made (e.g., by application server 106 of FIG. 1) that a new link has been added, an existing link has been removed, or a user connectivity value has changed. If, at step 404, it is determined that a node has changed, then process 400 may continue to step 410 (shown in FIG. 4B) to process the changed links, step 412 (shown in FIG. 4C) to save the nodes with changed links, step 414 (shown in FIG. 4D) to create path set input files, step 416 (shown in FIG. 4E) to remove paths with changed nodes, one or more iterations of step 418 (shown in FIG. 4F) to grow paths by one link at a time, step 420 (shown in FIG. 4G) to save the paths that have grown by one or more links, and step 422 (shown in FIG. 4H) to join paths that go through changed nodes. It should be noted that more than one step or task shown in FIGS. 4B, 4C, 4D, 4E, 4F, 4G, and 4H may be performed in parallel using, for example, a cluster of cores. For example, multiple steps or tasks shown in FIG. 4B may be executed in parallel or in a distributed fashion, then multiple steps or tasks shown in FIG. 4C may be executed in parallel or in a distributed fashion, then multiple steps or tasks shown in FIG. 4D may be executed in parallel or in a distributed fashion, then multiple steps or tasks shown in FIG. 4E may be executed in parallel or in a distributed fashion, and so on. In this way, overall latency associated with process 400 may be reduced.

As described above, step 418 may be executed one or more times. This step may be operative to grow paths by a single link. Each iteration of step 418 may take as input the results of a previous iteration of step 418 so that paths may grow by more than one link, if desired. In the example of FIG. 4A, three iterations of step 418 are shown. Thus, process 400 may generate paths with lengths less than or equal to three. In other embodiments, more or fewer iterations of step 418 may allow process 400 to generate paths with more or fewer If a node change is not detected at step 404, then process 400 enters a sleep mode at step 406. For example, in some embodiments, an application thread or process may continuously check to determine if at least one node or link has changed in the network community. In other embodiments, the application thread or process may periodically check for changed links and nodes every n seconds, where n is any positive number. After the paths are calculated that go through a changed node at step 416 or after a period of sleep at step 406, process 400 may determine whether or not to loop at step 408. For example, if all changed nodes have been updated, then process 400 may stop at step 418. If, however, there are more changed nodes or links to process, then process 400 may loop at step 408 and return to step 404.

In practice, one or more steps shown in process 400 may be combined with other steps, performed in any suitable order, performed in parallel (e.g., simultaneously or substantially simultaneously), or removed.

Figure 4B:
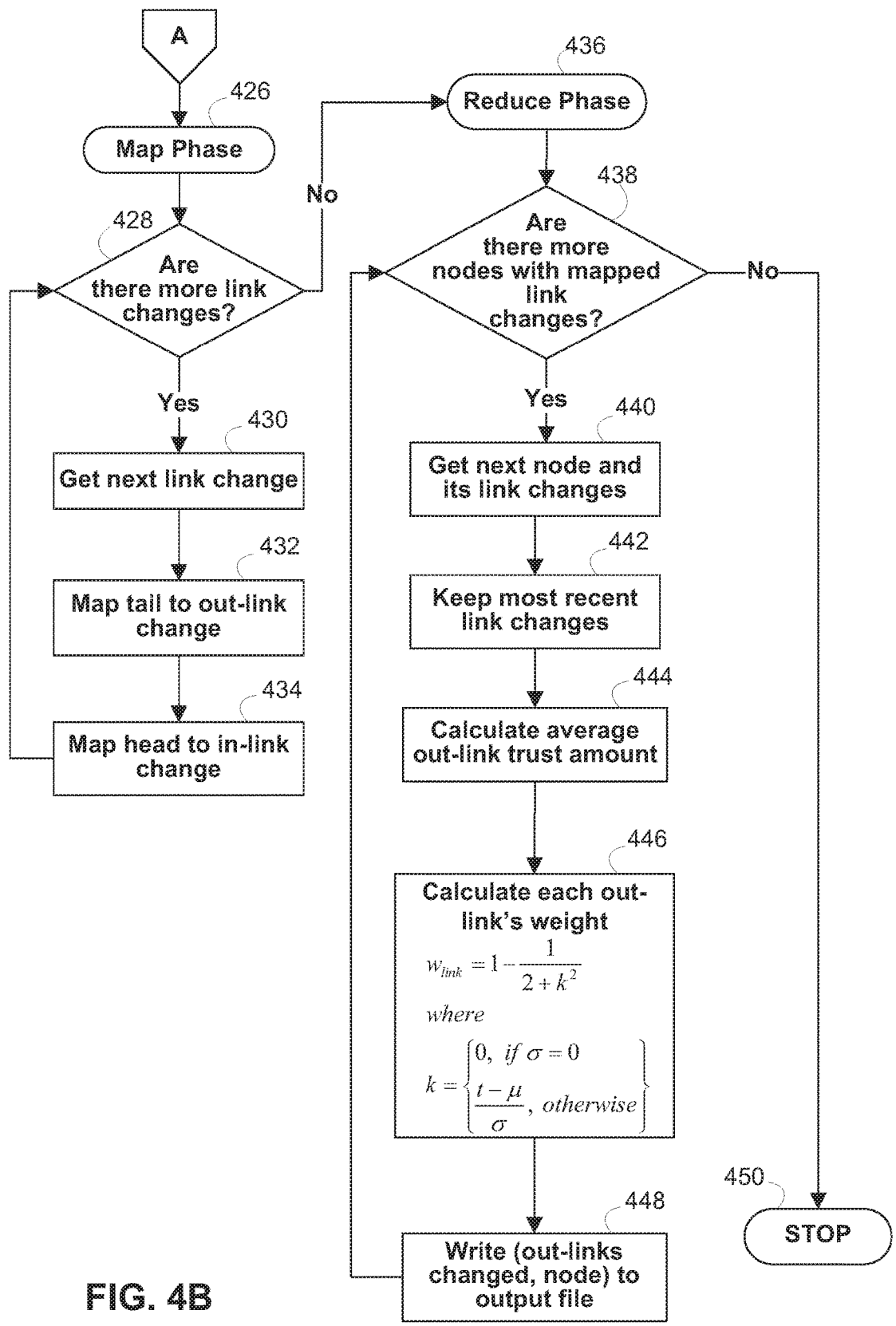

FIGS. 4B-4H each include processes with a "map" phase and "reduce" phase. As described above, these phases may form part of a map/reduce computational paradigm carried out by parallel computational framework 114 (FIG. 1), key-value store 112 (FIG. 1), or both. As shown in FIG. 4B, in order to process link changes, map phase 426 may include determining if there are any more link changes at step 428, retrieving the next link change at step 430, mapping the tail to out-link change at step 432, and mapping the head to in-link change at step 434.

If there are no more link changes at step 428, then, in reduce phase 436, a determination may be made at step 438 that there are more nodes with mapped link changes to process. If so, then the next node and its link changes may be retrieved at step 440. The most recent link changes may be preserved at step 442 while any intermediate link changes are replaced by more recent changes. For example, the timestamp stored in table 306 (FIG. 3) may be used to determine the time of every link or node change. At step 444, the average out-link user connectivity value may be calculated. For example, if node $n_1$ has eight out-links with assigned user connectivity values, these eight user connectivity values may be averaged at step 444. At step 446, each out-link's weight may be calculated in accordance with equation (1) or (2) above. At step 448, an output file may be created or appended with the out-links changed and corresponding changed node identifier. For example, one or more (out-links changed, node identifier) records may be written to the output file. Although the term "file" is sometimes used herein, the output need not be in a literal file or even file format. For example, any output stream, whether or not it is recorded, may be used. In some embodiments, some or all of the output file may be passed directly to a calling application, process, or function from a returning application, process, or function in the form of a stream or object return value. If there are no more nodes and link changes to process at step 438, the process may stop at step 450.

Figure 4C:
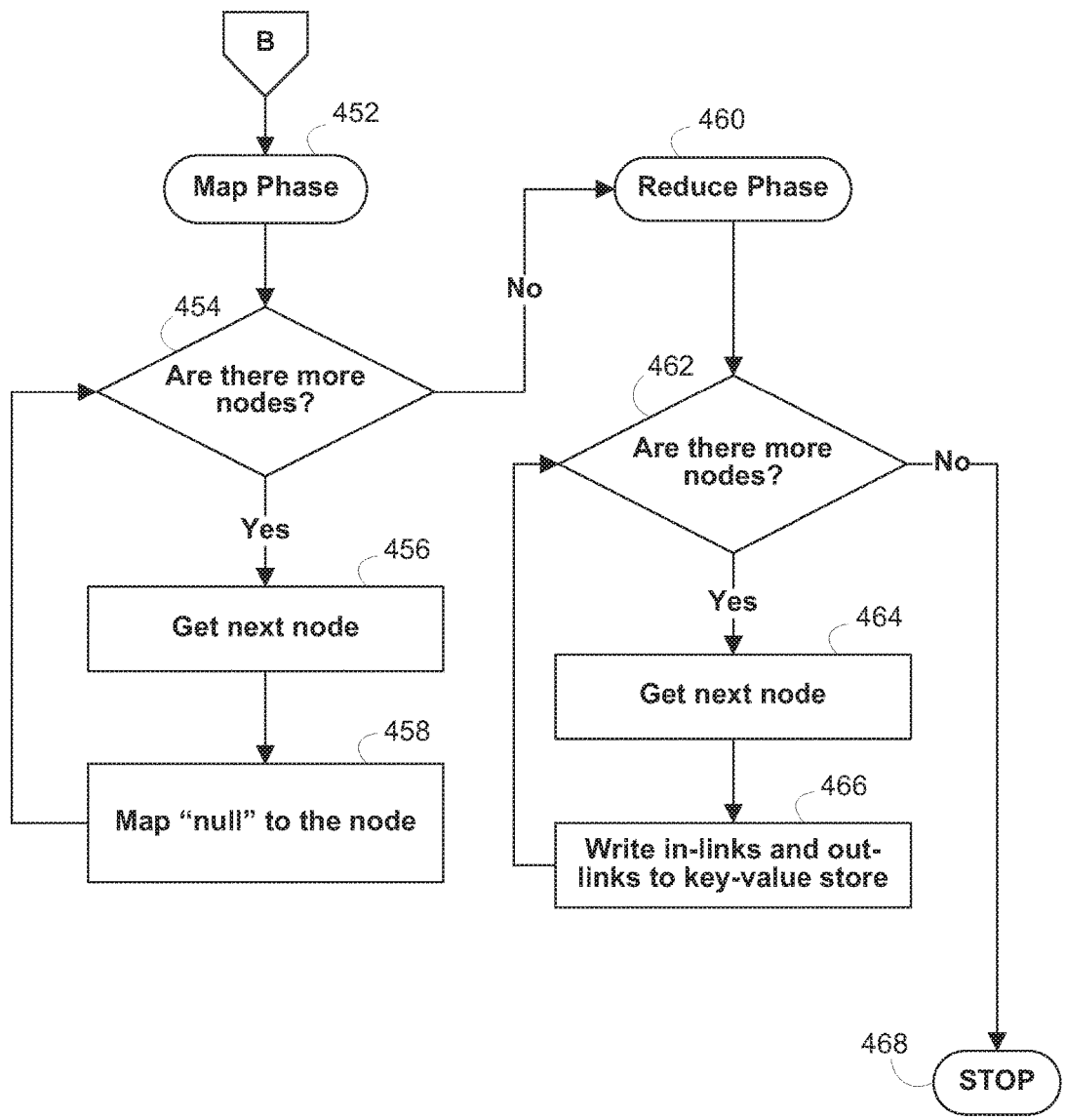

As shown in FIG. 4C, in order to save nodes with changed links, map phase 452 may include determining if there are any more changed nodes at step 454, retrieving the next changed node at step 456, and mapping "null" to the node at step 458.

If there are no more changed nodes at step 454, then, in reduce phase 460, a determination may be made at step 462 that there are more nodes to process. If so, then the next node may be retrieved at step 464. At step 466, the in-links and out-links associated with the node may be written to a key-value store (e.g., key-value store 112 of FIG. 1). As described above, the key-value store may implement an HBase cluster (or any other compressed, high performance database system, such as BigTable). If there are no more nodes to process at step 462, the process may stop at step 468.

Figure 4D:
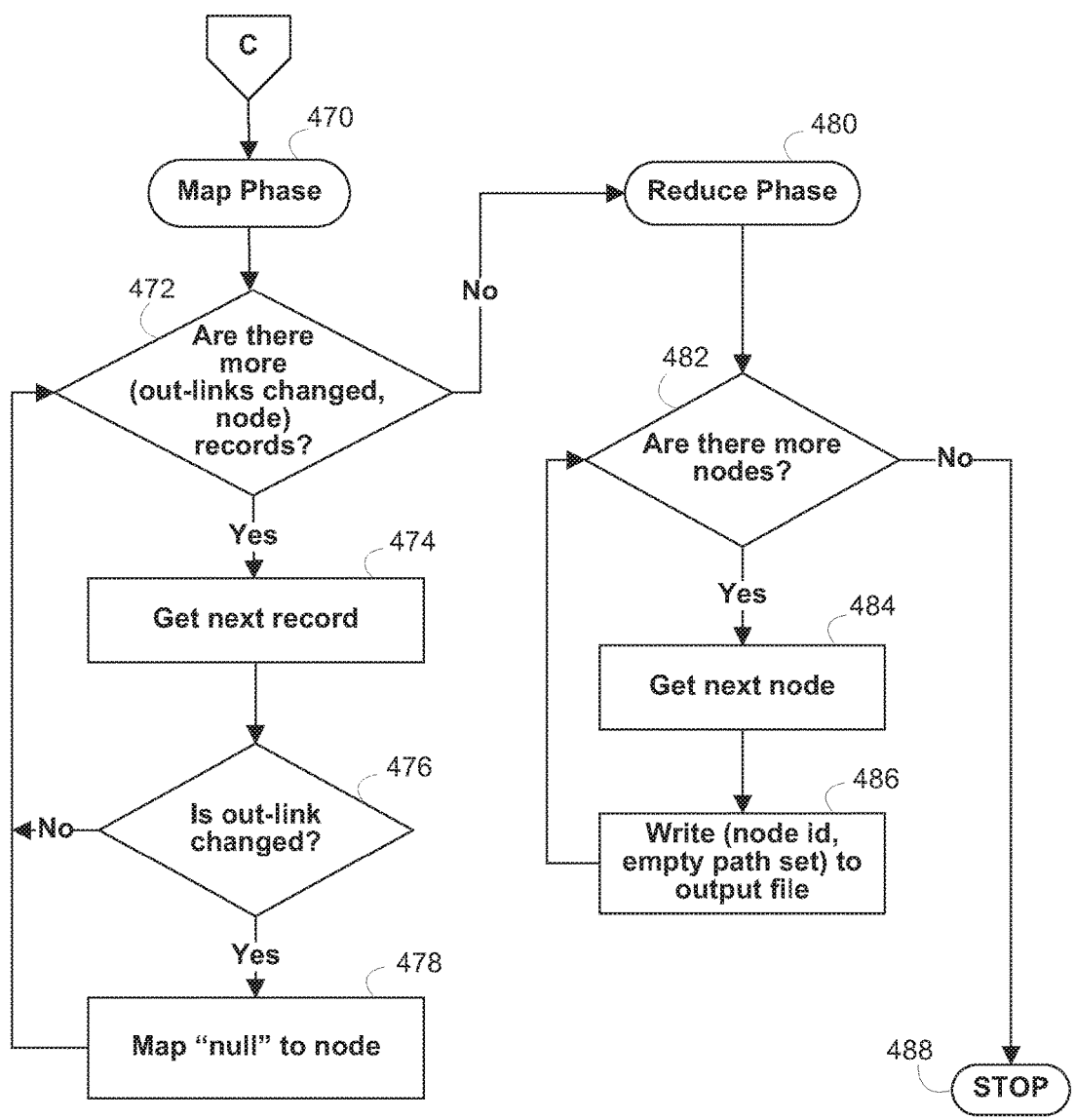

As shown in FIG. 4D, in order to create path set input files, map phase 470 may include determining if there are any more (out-links changed, node identifier) records in the output file created or appended at step 448 (FIG. 4B). If so, the next record may be retrieved at step 474. At step 476, a determination may be made if an out-link has changed. If so, then at step 478 a "null" value may be mapped to the node. Otherwise, map phase 470 may return to step 472 to determine if there are any more (out-links changed, node identifier) records in the output file.

If there are no more changed records at step 472, then, in reduce phase 480, a determination may be made at step 482 that there are more node to process. If so, then the next node may be retrieved at step 484. At step 486, new records may be written to the output file. In some embodiments, the records written at step 486 may include records of the form (node identifier, empty path set for the node identifier). If there are no more nodes to process at step 482, the process may stop at step 488.

Figure 4E:
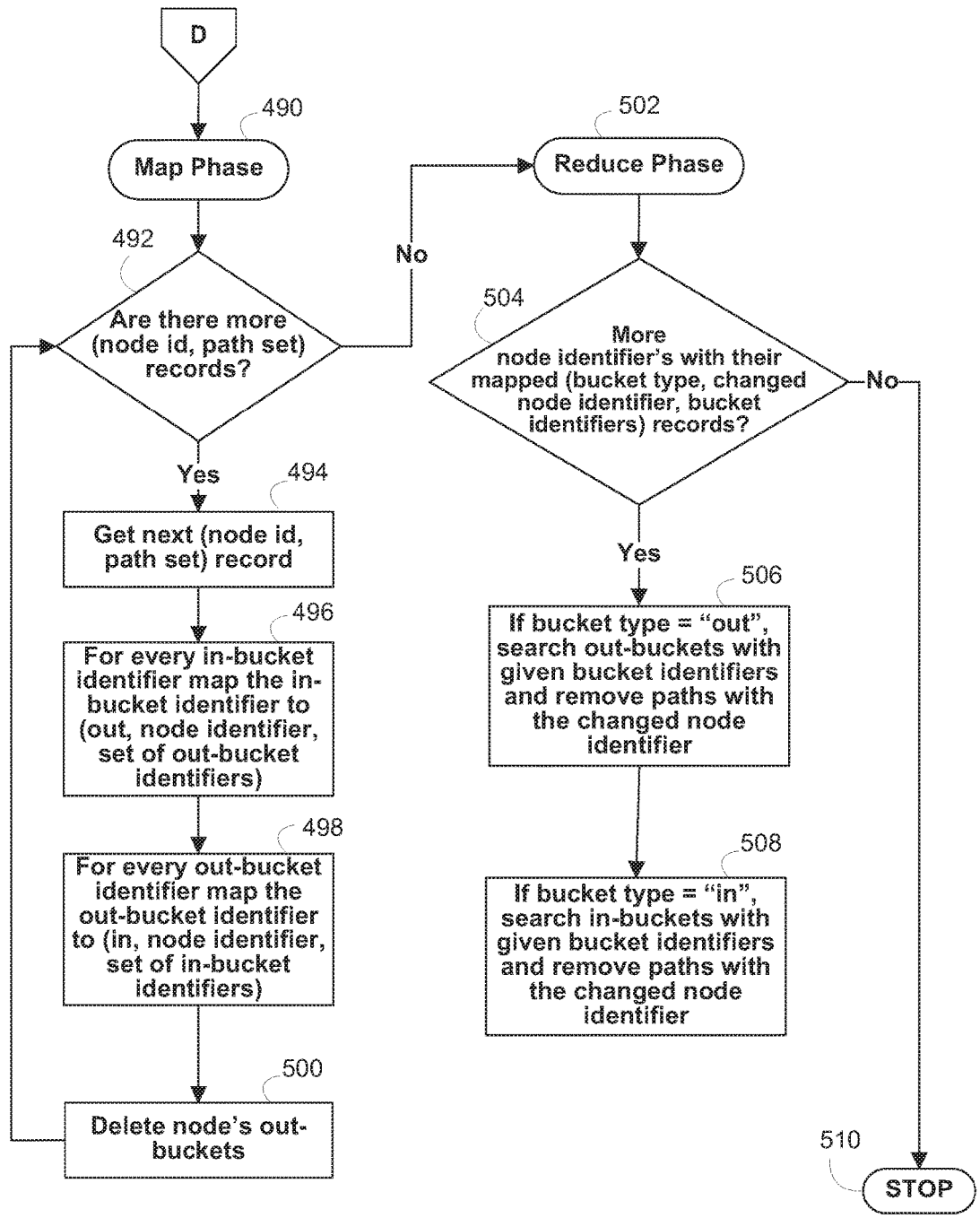

As shown in FIG. 4E, in order to remove paths with changed nodes, map phase 490 may include determining if there are any more (node identifier, path set) records in the output file at step 492 and retrieving the next such record at step 494. At step 496, for every "in" bucket identifier, the "in" bucket identifier may be mapped to a record of the form (out bucket type, node identifier, set of "out" bucket identifiers) (or any other suitable form). At step 498, for every "out" bucket identifier, the "out" bucket identifier may be mapped to a record of the form (in bucket type, node identifier, set of "in" bucket identifiers) (or any other suitable form). At step 500, the node's "out" buckets may be deleted, and the process may return to step 492 to determine if there are more records to process.

If there are no more records at step 492, then, in reduce phase 502, a determination may be made at step 504 that there are more node identifiers with their mapped (bucket type, changed node identifier, bucket identifiers) records to process. If so, then at step 506, if the bucket type is "out", out-buckets with the given bucket identifiers may be searched and paths with the changed node identifier may be removed. At step 508, if the bucket type is "in", in-buckets with the given bucket identifiers may be searched and paths with the changed node identifier may be removed. If there are no more records to process at step 504, the process may stop at step 510.

Figure 4F:
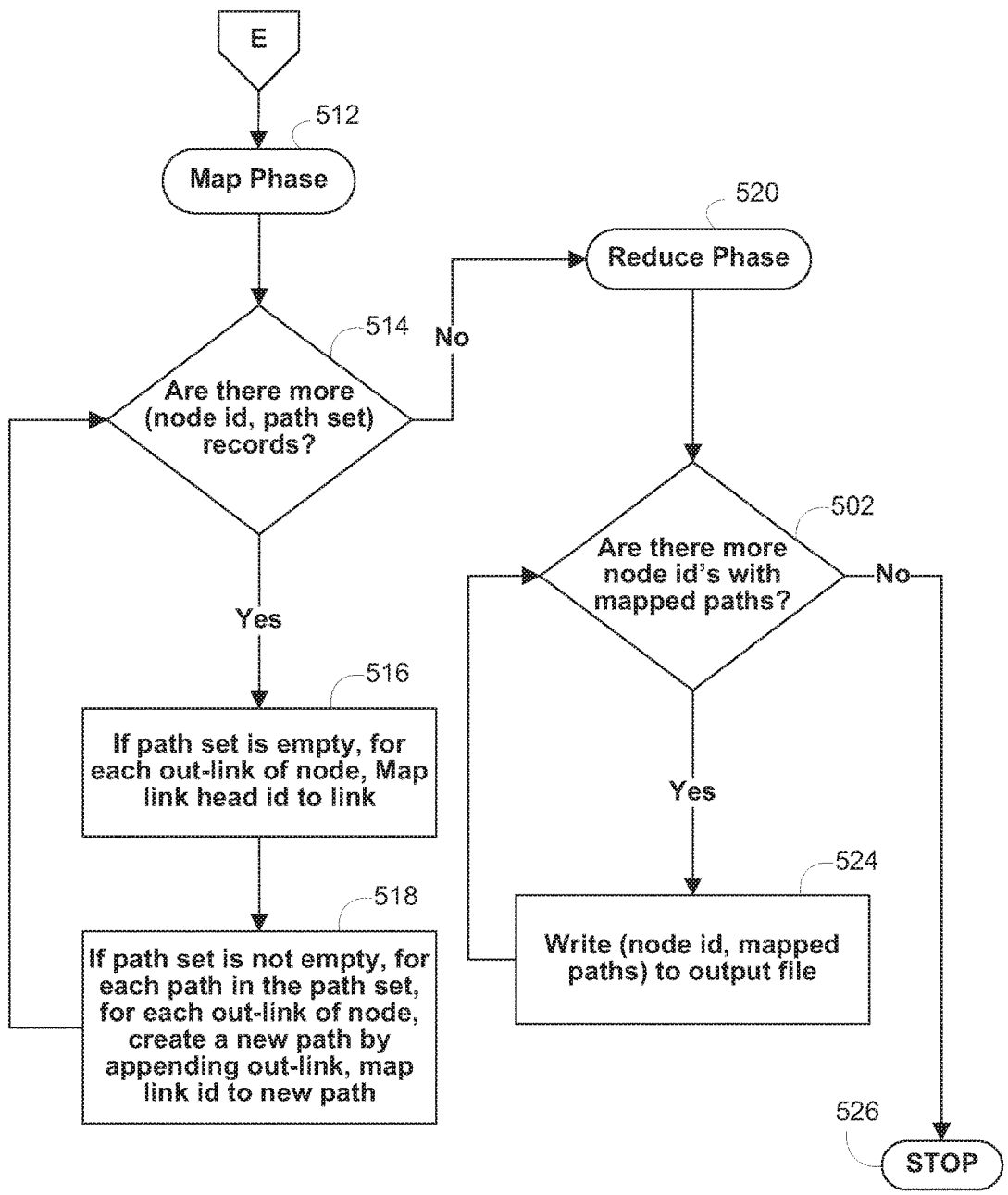

As shown in FIG. 4F, in order to grow paths by one link, map phase 512 may include determining if there are any more (node identifier, path set) records in the output file at step 514. If so, then at step 516, if the path set is empty, for each out-link of the node, a link head identifier may be mapped to the link. At step 518, if the path set is not empty, then for each path n in the path set, and for each out-link of a node, a new path may be created by appending (out-link, map link head identifier) to the new path.

If there are no more records at step 514, then, in reduce phase 520, a determination may be made at step 522 that there are more node identifiers with mapped paths to process. If so, then at step 524, new records of the form (node identifier, mapped paths) (or any other suitable form) may be written to the output file. If there are no more records to process at step 522, the process may stop at step 526.

The process shown in FIG. 4F may be executed one or more times, with the result of growing path lengths by one link for each execution. As shown in FIG. 4A, in some embodiments, three iterations of the process shown in FIG. 4F are used to grow paths by three links. In other embodiments, more or fewer iterations are used.

Figure 4G:
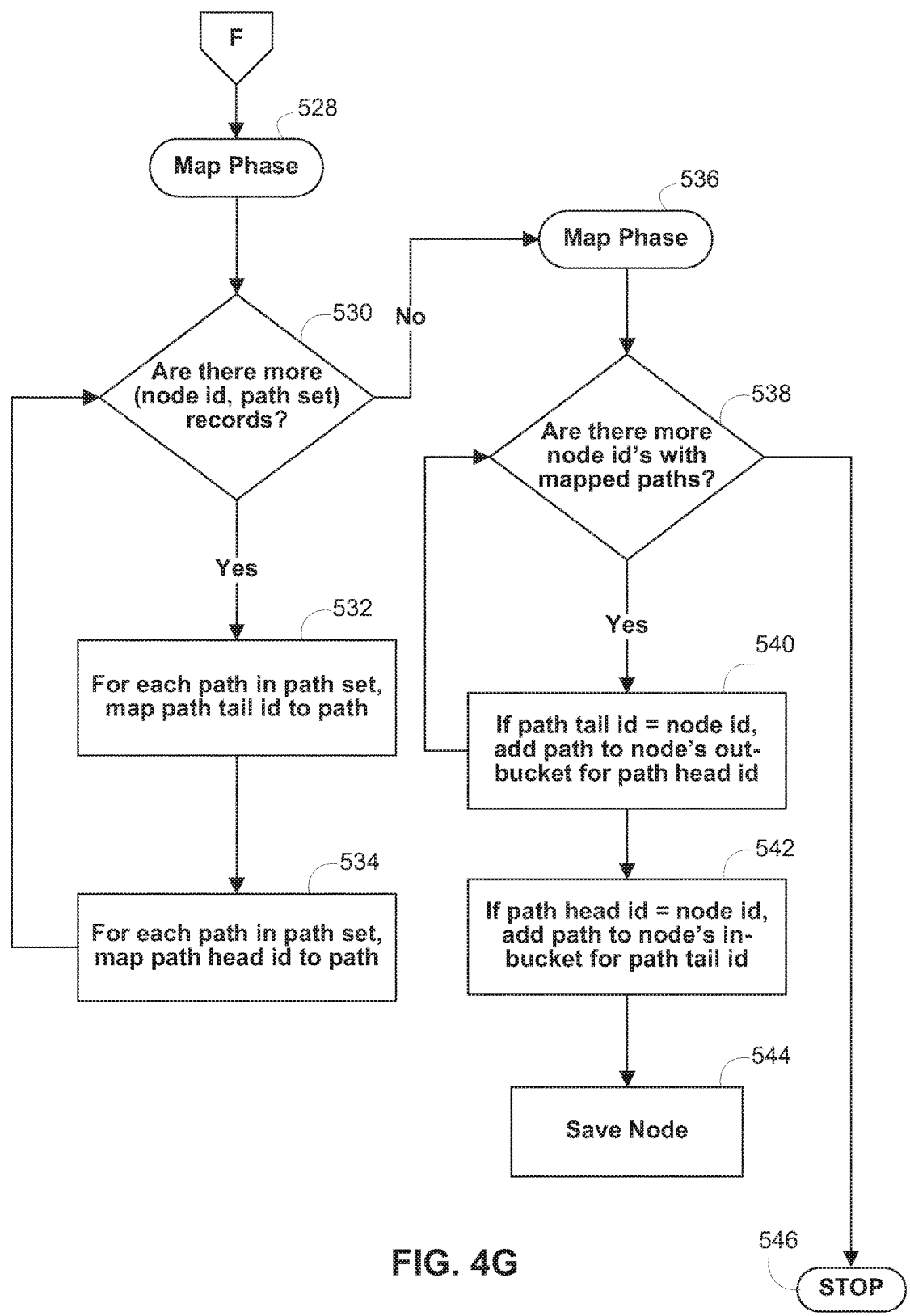

As shown in FIG. 4G, in order to save the new paths, map phase 528 may include determining if there are any more (node identifier, path set) records in the output file at step 530. If so, then at step 532, for each path in the path set, the path tail identifier may be mapped to the path. At step 534, for each path in the path set, the path head identifier may be mapped to the path.

If there are no more records at step 530, then, in reduce phase 536, a determination may be made at step 538 that there are more node identifiers with mapped paths to process. If so, then at step 540, if the path tail identifier equals the node identifier, then that path may be added to the node's "out" bucket for the path head identifier. At step 542, if the path head identifier equals the node identifier, then that path may be added to the node's "in" bucket for the path tail identifier. At step 544, the node may be saved. If there are no more records to process at step 538, the process may stop at step 546.

Figure 4H:
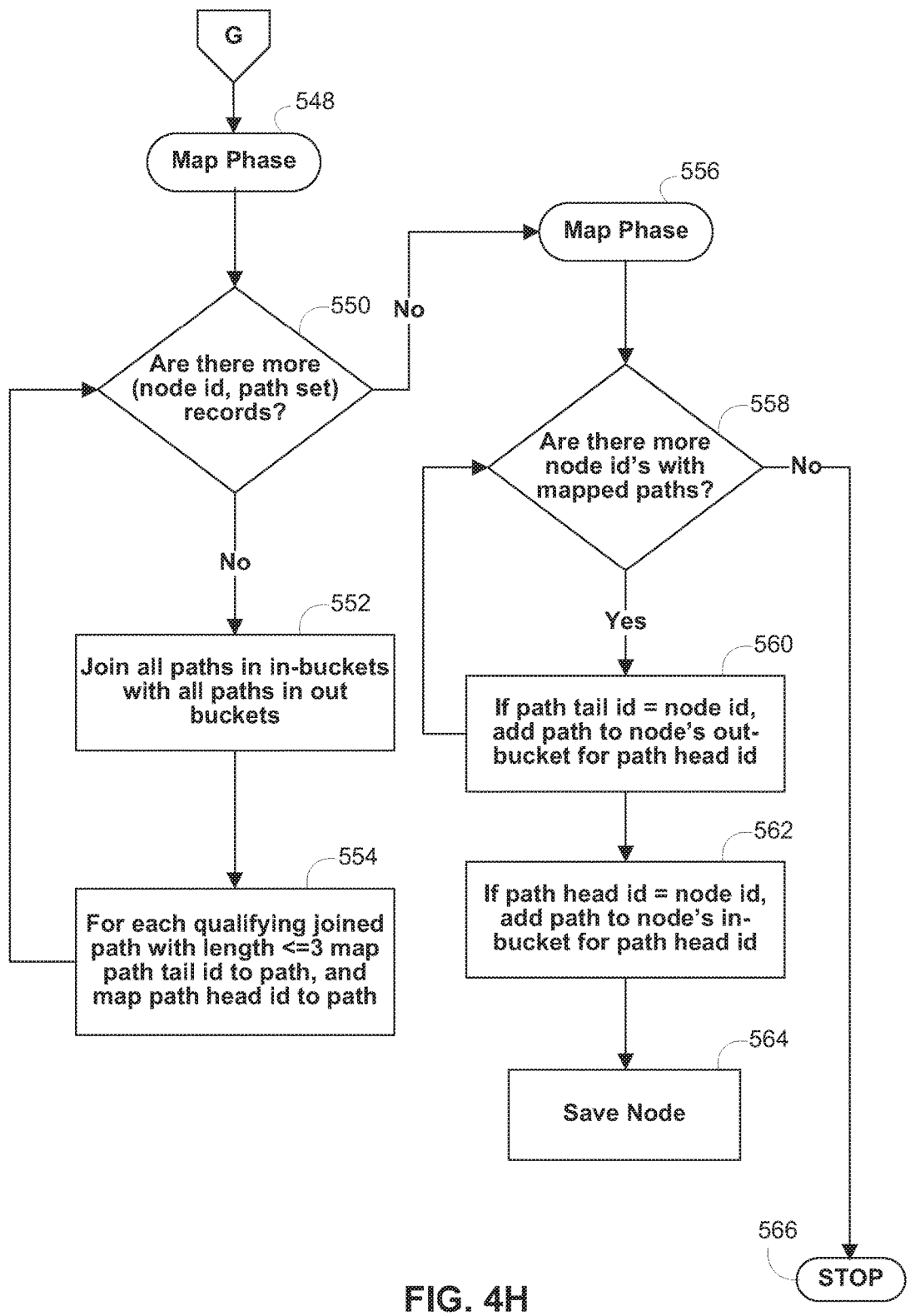

As shown in FIG. 4H, in order to join paths that go through changed nodes, map phase 548 may include determining if there are any more (node identifier, path set)

records in the output file at step 550. If so, then at step 552, all paths in "in" buckets may be joined with all paths in "out" buckets. At step 554, for each qualified joined path with length less than or equal to three (or the number of iterations of the process shown in FIG. 4F), the path tail identifier may be mapped to the path, and the path head identifier may also be mapped to the path.

If there are no more records at step 550, then, in reduce phase 556, a determination may be made at step 558 that there are more node identifiers with mapped paths to process. If so, then at step 560, if the path tail identifier equals the node identifier, then that path may be added to the node's "out" bucket for the path head identifier. At step 562, if the path head identifier equals the node identifier, then that path may be added to the node's "in" bucket for the path tail identifier. At step 564, the node may be saved. If there are no more records to process at step 558, the process may stop at step 566.

Figure 5:
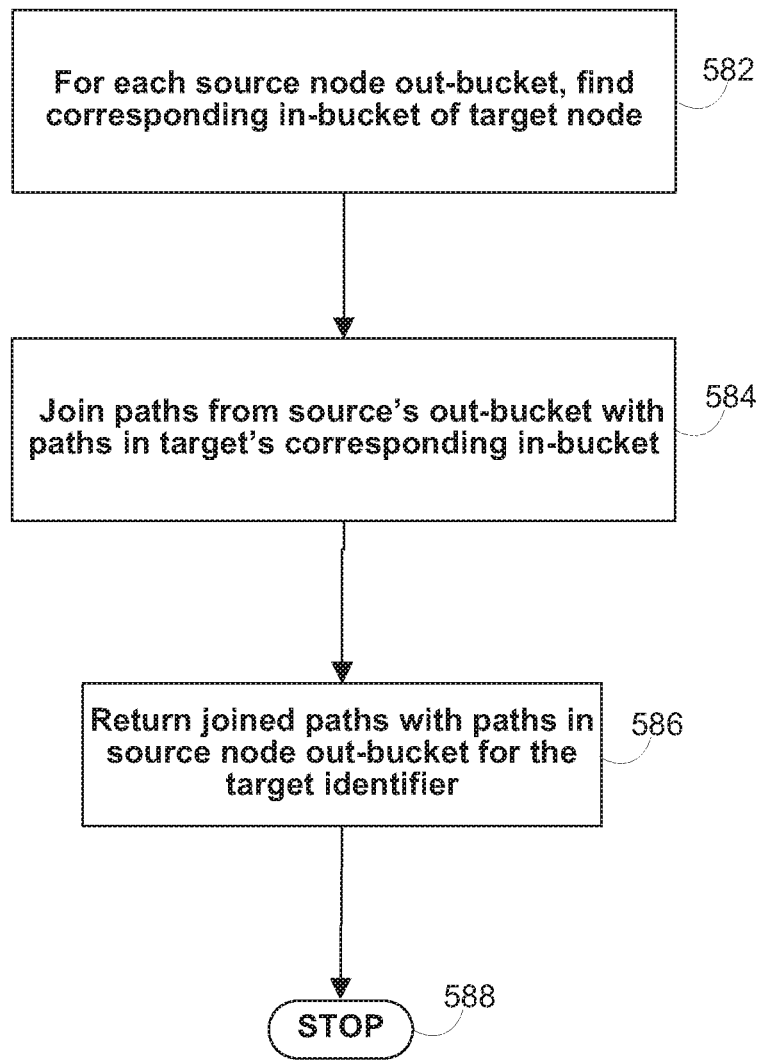
FIG. 5 shows an illustrative process for querying all paths to a target node and computing a network connectivity value in accordance with one embodiment of the invention.

FIG. 5 shows illustrative process 580 for supporting a user query for all paths from a first node to a target node. For example, a first node (representing, for example, a first individual or entity) may wish to know how connected the first node is to some second node (representing, for example, a second individual or entity) in the network community. In the context of trust described above (and where the user connectivity values represent, for example, at least partially subjective user trust values), this query may return an indication of how much the first node may trust the second node. In general, the more paths connecting the two nodes may yield a greater (or lesser if, for example, adverse ratings are used) network connectivity value (or network trust amount).

At step 582, for each source node "out" bucket, the corresponding "in" bucket of target nodes may be located. For example, column 320 of node table 312 (both of FIG. 3B) may be accessed at step 582. Paths from the source node's "out" bucket may then be joined with paths in the target node's "in" bucket at step 584. Joined paths with paths in the source node's "out" bucket may then be returned for the target node's identifier. Process 580 may stop at step 588.

Having returned all paths between the source and target node (of length less than or equal to three, or any other suitable value depending on the number of iterations of the process shown in FIG. 4F), a network connectivity value may be computed. The path weights assigned to the paths returned at step 586 may then be summed. The path weights may be normalized by dividing each path weight by the computed sum of the path weights. A network connectivity value may then be computed. For example, each path's user connectivity value may be multiplied by its normalized path weight. The network connectivity value may then be computed in some embodiments in accordance with:

$$t_{network} = \Sigma t_{path} \times w_{path} \quad (7)$$

where $t_{path}$ is the user connectivity value for a path (given in accordance with equation (5)) and $w_{path}$ is the normalized weight for that path. The network connectivity value may then be held, output by processing circuitry of application server 106, and/or stored on data store 110 (FIG. 1). In addition, a decision-making algorithm may access the network connectivity value in order to make automatic decisions (e.g., automatic network-based decisions, such as authentication or identity requests) on behalf of the user. Network connectivity values may additionally or alternatively be outputted to external systems and processes located at third-parties. The external systems and processes may be configured to automatically initiate a transaction (or take some particular course of action) based, at least in part, on the received network connectivity values. For example, some locales or organizations may require identity references in order to apply for a document (e.g., a passport, driver's license, group or club membership card, etc.). The identity reference or references may vouch that an individual actually exists and/or is the individual the applicant is claiming to be. Network connectivity values may be queried by the document issuer (e.g., a local government agency, such as the Department of Motor Vehicles or a private organization) and used as one (or the sole) metric in order to verify the identity of the applicant, the identity of an identity reference, or both. In some embodiments, network connectivity values may be used as an added assurance of the identity of an applicant or reference in conjunction with more traditional forms of identification (e.g., document verification and knowledge-based identity techniques). If the document issuer (or some other party trusted by the document issuer) has a set of strong paths from the applicant or reference, this may indicate a higher degree of confidence in the identity of the applicant or reference. Such an indication may be outputted to the third-party system or process.

As another example, credit-granting decisions may be made by third parties based, at least in part, network connectivity values. One or more queries for a network connectivity value may be automatically executed by the credit-granting institution (e.g., a bank, private financial institution, department store) as part of the credit application process. For example, a query for a network connectivity value between the applicant and the credit-granting institution itself (or it's directors, board members, etc.) and between the applicant and one or more trusted nodes may be automatically executed as part of the credit application process. The one or more network connectivity values returned to the credit-granting institution may then be used as an input to a proprietary credit-granting decision algorithm. In this way, a credit-granting decision may be based on a more traditional component (e.g., occupation, income, repayment delinquencies, and credit score) and a network connectivity component. Each component may be assigned a weight and a weighted sum or weighted average may be computed. The weighted sum or average may then be used directly to make an automatic credit-granting decision for the applicant. The weights assigned to each component of the weighted sum or average may be based on such factors as the applicant's credit history with the financial institution, the amount of credit requested, the degree of confidence in the trusted nodes, any other suitable factor, or any combination of the foregoing factors.

In practice, one or more steps shown in process 580 may be combined with other steps, performed in any suitable order, performed in parallel (e.g., simultaneously or substantially simultaneously), or removed. In addition, as described above, various threshold functions may be used in order to reduce computational complexity. For example, a threshold function defining the maximum number of links to traverse may be defined. Paths containing more than the threshold specified by the threshold function may not be considered in the network connectivity determination. In addition, various threshold functions relating to link and path weights may be defined. Links or paths below the threshold weight specified by the threshold function may not be considered in the network connectivity determination.

Although process 580 describes a single user query for all paths from a first node to a target node, in actual implementations groups of nodes may initiate a single query for all the paths from each node in the group to a particular target node.

For example, multiple members of a network community may all initiate a group query to a target node. Process 580 may return an individual network connectivity value for each querying node in the group or a single composite network connectivity value taking into account all the nodes in the querying group. For example, the individual network connectivity values may be averaged to form a composite value or some weighted average may be used. The weights assigned to each individual network connectivity value may be based on seniority in the community (e.g., how long each node has been a member in the community), rank, or social stature. In addition, in some embodiments, a user may initiate a request for network connectivity values for multiple target nodes in a single query. For example, node $n_1$ may wish to determine network connectivity values between it and multiple other nodes. For example, the multiple other nodes may represent several candidates for initiating a particular transaction with node $n_1$. By querying for all the network connectivity values in a single query, the computations may be distributed in a parallel fashion to multiple cores so that some or all of the results are computed substantially simultaneously.

In addition, queries may be initiated in a number of ways. For example, a user (represented by a source node) may identify another user (represented by a target node) in order to automatically initiate process 580. A user may identify the target node in any suitable way, for example, by selecting the target node from a visual display, graph, or tree, by inputting or selecting a username, handle, network address, email address, telephone number, geographic coordinates, or unique identifier associated with the target node, or by speaking a predetermined command (e.g., "query node 1" or "query node group 1, 5, 9" where 1, 5, and 9 represent unique node identifiers). After an identification of the target node or nodes is received, process 580 may be automatically executed. The results of the process (e.g., the individual or composite network connectivity values) may then be automatically sent to one or more third-party services or processes as described above.

In an embodiment, a user may utilize access application 102 to generate a user query that is sent to access application server 106 over communications network 104 (see also, FIG. 1) and automatically initiate process 580. For example, a user may access an Apple iOS, Android, or WebOS application or any suitable application for use in accessing application 106 over communications network 104. The application may display a searchable list of relationship data related to that user (e.g., "friend" or "follower" data) from one or more of Facebook, MySpace, openSocial, Friendster, Bebo, hi5, Orkut, PerfSpot, Yahoo! 360, LinkedIn, Twitter, Google Buzz, Really Simple Syndication readers or any other social networking website or information service. In some embodiments, a user may search for relationship data that is not readily listed—i.e., search Facebook, Twitter, or any suitable database of information for target nodes that are not displayed in the searchable list of relationship data. A user may select a target node as described above (e.g., select an item from a list of usernames representing a "friend" or "follower") to request a measure of how connected the user is to the target node. Using the processes described with respect to FIGS. 3 and 4A-H, this query may return an indication of how much the user may trust the target node. The returned indication may be displayed to the user using any suitable indicator. In some embodiments, indicator may be a percentage that indicates how trustworthy the target node is to the user.

In some embodiments, a user may utilize access application 102 to provide manual assignments of at least partially subjective indications of how trustworthy the target node is. For example, the user may specify that he or she trusts a selected target node (e.g., a selected "friend" or "follower") to a particular degree. The particular degree may be in the form of a percentage that represents the user's perception of how trustworthy the target node is. The user may provide this indication before, after, or during process 580 described above. The indication provided by the user (e.g., the at least partially subjective indications of trustworthiness) may then be automatically sent to one or more third-party services or processes as described above. In some embodiments, the indications provided by the user may cause a node and/or link to change in a network community. This change may cause a determination to be made that at least one node and/or link has changed in the network community, which in turn triggers various processes as described with respect to FIGS. 3 and 4A-4H.

In some embodiments, a user may utilize access application 102 to interact with or explore a network community. For example, a user may be presented with an interactive visualization that includes one or more implicit or explicit representations of connectivity values between the user and other individuals and/or entities within the network community. This interactive visualization may allow the user to better understand what other individuals and/or entities they may trust within a network community, and/or may encourage and/or discourage particular interactions within a user's associated network community or communities.

In some embodiments, a path counting approach may be used in addition to or in place of the weighted link approach described above. Processing circuitry (e.g., of application server 106 (FIG. 1)) may be configured to count the number of paths between a first node $n_1$ and a second node $n_2$ within a network community. A connectivity rating $R_{n1n2}$ may then be assigned to the nodes. The assigned connectivity rating may be proportional to the number of paths, or relationships, connecting the two nodes. A path with one or more intermediate nodes between the first node $n_1$ and the second node $n_2$ may be scaled by an appropriate number (e.g., the number of intermediate nodes) and this scaled number may be used to calculate the connectivity rating.

Each equation presented above should be construed as a class of equations of a similar kind, with the actual equation presented being one representative example of the class. For example, the equations presented above include all mathematically equivalent versions of those equations, reductions, simplifications, normalizations, and other equations of the same degree.

The above described embodiments of the invention are presented for purposes of illustration and not of limitation. The following claims give additional embodiments of the present invention.

What is claimed is:

1. A system for determining network connectivity between a first node and a second node connected to the first node by at least one path, the system comprising,
   a data store device,
   a key value store device,
   an application server comprising processing circuitry,
   a parallel computational framework comprising a plurality of processors,
   wherein the parallel computational framework is connected to the data store device, the key-value store device and the application server,
   the system being operable to:

receive via a communications network, from a user device comprising a processor, a user request for a network connectivity value between a first entity of a network community and a second entity of the network community, wherein the network connectivity value is indicative of a trustworthiness associated by the first entity to the second entity, and wherein the first node in a connectivity graph represents the first entity and the second node in the connectivity graph represents the second entity;

transmit an indication of the user request to a first remote server;

receive an indication of the network connectivity value from the first remote server, wherein the network connectivity value is a result of a process performed by the parallel computational framework and the application server, the process comprising:

automatically obtaining user interaction information between entities of the network community from a plurality of sources, determining user connectivity values associated with links in the connectivity graph based on the user interaction information, wherein the user connectivity values are indicative of trustworthiness of the entities of the network community, retrieving, from a memory on the first remote server, a first list that identifies outgoing paths from the first node, retrieving, from a memory on one of the first remote server or a second remote server, a second list that identifies incoming paths to the second node, joining an incoming path to the second node with an outgoing path from the first node to produce a joined path, and multiplying a product of weights associated with links of the joined path with a minimum user connectivity value assigned to a link in the joined path to determine the network connectivity value; and automatically determine at least one prospective decision regarding the second entity based on a magnitude of the network connectivity value.

2. The system of claim 1, wherein the process resulting in the network connectivity value further comprises accessing a link threshold value, and wherein joining the incoming path to the second node with the outgoing path from the first node comprises joining only those paths containing fewer links than the accessed link threshold value.

3. The system of claim 1, wherein the process resulting in the network connectivity value further comprises accessing a path weight threshold value, and wherein joining the incoming path to the second node with the outgoing path from the first node comprises joining only those paths with a normalized path weight above the accessed path weight threshold value.

4. The system of claim 1, wherein the process resulting in the network connectivity value further comprises calculating the weights associated with the links of the joined path, and wherein calculating the weights comprises:

calculating an average of user connectivity values associated with the links of the joined path; and for each link of the joined path, subtracting the average of the user connectivity values from a user connectivity value assigned to the link of the joined path.

5. The system of claim 1, wherein a plurality of the user connectivity values each represent a subjective user trust value or competency assessment.

6. The system of claim 1, wherein the process resulting in the network connectivity value further comprises accessing third-party ratings data, and wherein the network connectivity value is based, at least in part, on the third-party ratings data.

7. The system of claim 1, wherein joining an incoming path to the second node with an outgoing path from the first node comprises accessing data from a social networking service.

8. The system of claim 1, wherein the processing circuitry is further configured to receive the user request for the network connectivity value by:

causing to be generated for display, at the user device, a searchable list of a plurality of entities in the network community, wherein the plurality of entities comprises the second entity; and receiving a selection of at least one of the plurality of entities, wherein the at least one of the plurality of entities comprises the second entity.

9. The system of claim 1, wherein the plurality of sources are chosen from a group consisting of social media networks, political party memberships, religious organization memberships, ratings agencies, credit bureaus, consumer complaints, criminal histories, legal records, media, search engine results, official document issuers, email services, data syndicators, address databases, transportation passenger lists, gambling databases, business listings, hospital affiliations, and university affiliations.

10. The system of claim 1, wherein the connectivity graph is a social network graph.

11. A data processing method for determining network connectivity between a first node and a second node connected to the first node by at least one path using a parallel computational framework comprising a plurality of processors, wherein the parallel computational framework is connected to a data store device, a key-value store device and an application server comprising processing circuitry, the method comprising:

receiving, using processing circuitry at a user device, a user request for a network connectivity value between a first entity of a network community and a second entity of the network community, wherein the network connectivity value is indicative of a trustworthiness associated by the first entity to the second entity, and wherein the first node in a connectivity graph represents the first entity and the second node in the connectivity graph represents the second entity;

transmitting, using processing circuitry, an indication of the user request from the user device to a first remote server;

receiving, using processing circuitry at the user device, an indication of the network connectivity value from the first remote server, wherein the network connectivity value is a result of a process implemented by the parallel computational framework and the application server, the process comprising:

automatically obtaining user interaction information between entities of the network community from a plurality of sources;

determining user connectivity values associated with links in the connectivity graph based on the user interaction information, wherein the user connectivity values are indicative of trustworthiness of the entities of the network community;

retrieving, from a memory on the first remote server, a first list that identifies outgoing paths from the first node;

retrieving, from a memory on one of the first remote server or a second remote server, a second list that identifies incoming paths to the second node;

joining an incoming path to the second node with an outgoing path from the first node to produce a joined path; and multiplying a product of weights associated with links of the joined path with a minimum user connectivity value assigned to a link in the joined path to determine the network connectivity value; and automatically determining, using processing circuitry, at least one prospective decision regarding the second entity based on a magnitude of the network connectivity value.

12. The method of claim 11, wherein the process implemented by the parallel computational framework and the application server resulting in the network connectivity value further comprises accessing a link threshold value, and wherein joining the incoming path to the second node with the outgoing path from the first node comprises joining only those paths containing fewer links than the accessed link threshold value.

13. The method of claim 11, wherein the process implemented by the parallel computational framework and the application server resulting in the network connectivity value further comprises accessing a path weight threshold value, and wherein joining the incoming path to the second node with the outgoing path from the first node comprises joining only those paths with a normalized path weight above the accessed path weight threshold value.

14. The method of claim 11, wherein the process implemented by the parallel computational framework and the application server resulting in the network connectivity value further comprises calculating the weights associated with the links of the joined path, and wherein calculating the weights comprises:

calculating an average of user connectivity values associated with the links of the joined path; and for each link of the joined path, subtracting the average of the user connectivity values from a user connectivity value assigned to the link of the joined path.

15. The method of claim 11, wherein a plurality of the user connectivity values determined by the parallel computational framework and the application server each represent a subjective user trust value or competency assessment.

16. The method of claim 11, wherein the process implemented by the parallel computational framework and the application server resulting in the network connectivity value further comprises accessing third-party ratings data, and wherein the network connectivity value is based, at least in part, on the third-party ratings data.

17. The method of claim 11, wherein joining an incoming path to the second node with an outgoing path from the first node comprises accessing data from a social networking service.

18. The method of claim 11, wherein receiving, at the user device, the user request for the network connectivity value determined by the parallel computational framework and the application server comprises:

generating for display, at the user device, a searchable list of a plurality of entities in the network community, wherein the plurality of entities comprises the second entity; and receiving a selection of at least one of the plurality of entities, wherein the at least one of the plurality of entities comprises the second entity.

19. The method of claim 11, wherein the plurality of sources are chosen from a group consisting of social media networks, political party memberships, religious organization memberships, ratings agencies, credit bureaus, consumer complaints, criminal histories, legal records, media, search engine results, official document issuers, email services, data syndicators, address databases, transportation passenger lists, gambling databases, business listings, hospital affiliations, and university affiliations.

20. The method of claim 11, wherein the connectivity graph is a social network graph.

* * * * *